US012693857B2

(12) United States Patent
Choquette et al.

(10) Patent No.: US 12,693,857 B2
(45) Date of Patent: Jul. 28, 2026

(54) EFFICIENT MATRIX MULTIPLY AND ADD WITH A GROUP OF WARPS

(71) Applicant: NVIDIA Corporation, Santa Clara, CA (US)

(72) Inventors: Jack Choquette, Santa Clara, CA (US); Manan Patel, Santa Clara, CA (US); Maciej Tyrlik, Santa Clara, CA (US); Ronny Krashinsky, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1145 days.

(21) Appl. No.: 17/691,406

(22) Filed: Mar. 10, 2022

(65) Prior Publication Data

US 2023/0289398 A1 Sep. 14, 2023

(51) Int. Cl.
*G06F 17/16* (2006.01)
*G06F 9/30* (2018.01)
*G06F 9/38* (2018.01)
*G06F 7/544* (2006.01)

(52) U.S. Cl.
CPC .......... *G06F 9/3001* (2013.01); *G06F 9/3009* (2013.01); *G06F 9/3851* (2013.01); *G06F 9/3887* (2013.01); *G06F 17/16* (2013.01); *G06F 7/5443* (2013.01)

(58) Field of Classification Search
None
See application file for complete search history.

(56) References Cited

U.S. PATENT DOCUMENTS

| | | | | |
|---|---|---|---|---|
| 10,891,538 | B2 * | 1/2021 | Dally | .................... G06F 9/3001 |
| 12,147,804 | B2 * | 11/2024 | Valentine | ........... G06F 9/30036 |
| 2015/0324949 | A1 * | 11/2015 | Alsup | ................... G06F 9/3851 |
| | | | | 345/522 |
| 2020/0020070 | A1 * | 1/2020 | Appu | ........................ G06T 1/20 |
| 2021/0312697 | A1 * | 10/2021 | Maiyuran | ........... G06F 12/0875 |
| 2023/0288471 | A1 | 9/2023 | Duluk | |
| 2023/0289189 | A1 | 9/2023 | Bangalore Prabhakar | |
| 2023/0289190 | A1 * | 9/2023 | Parle | ..................... G06F 9/3887 |
| 2023/0289211 | A1 | 9/2023 | Hirota | |
| 2023/0289212 | A1 | 9/2023 | Duluk | |
| 2023/0289215 | A1 | 9/2023 | Palmer | |
| 2023/0289242 | A1 | 9/2023 | Guo | |
| 2023/0289292 | A1 * | 9/2023 | Minkin | ............... G06F 12/0207 |
| 2023/0289304 | A1 * | 9/2023 | Minkin | ............... G06F 12/0862 |
| 2023/0315655 | A1 | 10/2023 | Choquette | |

* cited by examiner

*Primary Examiner* — Hyun Nam
(74) *Attorney, Agent, or Firm* — Nixon & Vanderhye, P.C.

(57) ABSTRACT

This specification describes techniques for implementing matrix multiply and add (MMA) operations in graphics processing units (GPU)s and other processors. The implementations provide for a plurality of warps of threads to collaborate in generating the result matrix by enabling each thread to share its respective register files to be accessed by the datapaths associated with other threads in the group of warps. A state machine circuit controls a MMA execution among the warps executing on asynchronous computation units. A group MMA (GMMA) instruction provides for a descriptor to be provided as parameter where the descriptor may include information regarding size and formats of input data to be loaded into shared memory and/or the datapath.

18 Claims, 19 Drawing Sheets

Example General Processing Cluster

EFFICIENT MATRIX MULTIPLY AND ADD WITH A GROUP OF WARPS

CROSS-REFERENCES TO RELATED APPLICATIONS

This application is related to the following commonly-assigned copending US patent applications, the entire contents of each of which are incorporated by reference:

U.S. application Ser. No. 17/691,276 filed Mar. 10, 2022, titled "Method And Apparatus For Efficient Access To Multidimensional Data Structures And/Or Other Large Data Blocks";

U.S. application Ser. No. 17/691,621 filed Mar. 10, 2022, titled "Cooperative Group Arrays";

U.S. application Ser. No. 17/691,690 filed Mar. 10, 2022, titled "Distributed Shared Memory";

U.S. application Ser. No. 17/691,759 filed Mar. 10, 2022, titled "Virtualizing Hardware Processing Resources in a Processor";

U.S. application Ser. No. 17/691,288 filed Mar. 10, 2022, titled "Programmatically Controlled Data Multicasting Across Multiple Compute Engines";

U.S. application Ser. No. 17/691,296 filed Mar. 10, 2022, titled "Hardware Accelerated Synchronization With Asynchronous Transaction Support";

U.S. application Ser. No. 17/691,303 filed Mar. 10, 2022, titled "Fast Data Synchronization In Processors And Memory";

U.S. application Ser. No. 17/691,872 filed Mar. 10, 2022, titled "Techniques for Scalable Load Balancing of Thread Groups in a Processor";

U.S. application Ser. No. 17/691,808 filed Mar. 10, 2022, titled "Flexible Migration of Executing Software Between Processing Components Without Need For Hardware Reset"; and U.S. application Ser. No. 17/691,422 filed Mar. 10, 2022, titled "Method And Apparatus For Efficient Access To Multidimensional Data Structures And/Or Other Large Data Blocks".

FIELD

This technology generally relates to improving processing efficiency. More particularly, the technology herein relates to specialized circuitry for handling matrix multiply operations.

BACKGROUND

Users want deep learning and high performance computing (HPC) compute programs to continue to scale as graphics processing unit (GPU) technology improves and the number of processing core units increases per chip with each generation. What is desired is a faster time to solution for a single application, not scaling only by running more independent applications.

FIG. 1A shows example deep learning (DL) networks comprising long chains of sequentially-dependent compute-intensive layers. Each layer is calculated using operations such as e.g., multiplying input activations against a matrix of weights to produce output activations. The layers are typically parallelized across a GPU or cluster of GPUs by dividing the work into output activation tiles each representing the work one processing core will process.

Due to the potentially massive number of computations deep learning requires, faster is usually the goal. And it makes intuitive sense that performing many computations in parallel will speed up processing as compared to performing all those computations serially. In fact, the amount of performance benefit an application will realize by running on a given GPU implementation typically depends entirely on the extent to which it can be parallelized. But there are different approaches to parallelism.

Conceptually, to speed up a process, one might have each parallel processor perform more work (see FIG. 1B) or one might instead keep the amount of work on each parallel processor constant and add more processors (see FIG. 1C). Consider an effort to repave a highway several miles long. You as the project manager want the repaving job done in the shortest amount of time in order to minimize traffic disruption. It is obvious that the road repaving project will complete more quickly if you have several crews working in parallel on different parts of the road. But which approach will get the job done more quickly—asking each road crew to do more work, or adding more crews each doing the same amount of work? It turns out that the answer depends on the nature of the work and the resources used to support the work.

Computer scientists refer to the first approach as "weak scaling" and the second approach as "strong scaling."

Users of such applications thus typically want strong scaling, which means a single application can achieve higher performance without having to change its workload—for instance, by increasing its batch size to create more inherent parallelism. Users also expect increased speed performance when running existing (e.g., recompiled) applications on new, more capable GPU platforms offering more parallel processors. GPU development has met or even exceeded the expectations of the marketplace in terms of more parallel processors and more coordination/cooperation between increased numbers of parallel execution threads running on those parallel processors—but further performance improvements to achieve strong scaling are still needed.

Matrix multiplication, or more specifically matrix multiply and add (MMA), is an operation that is very common in many applications such as deep learning or other artificial intelligence applications, physics applications, graphics and the like which are often run on GPU platforms. Previous generations of GPU's have provided hardware support for making MMA faster and more scalable.

Although the hardware supported MMA operations enabled significant speed and scale improvements in previous GPU generations, further improvements are desired.

DETAILED DESCRIPTION OF EXAMPLE NON-LIMITING EMBODIMENTS

Figure 1A:
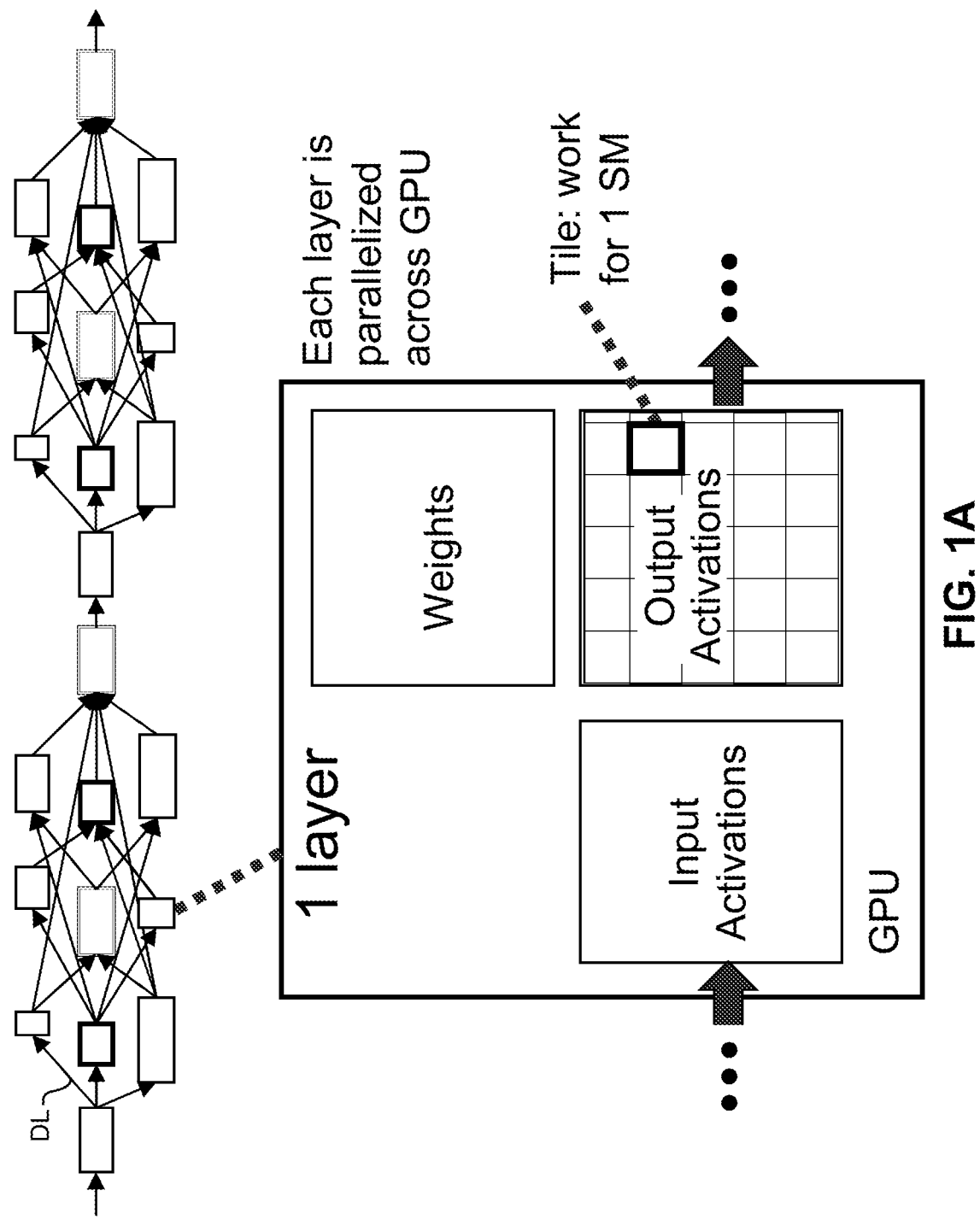
FIG. 1A shows an example application running on a GPU.
Figure 1C:
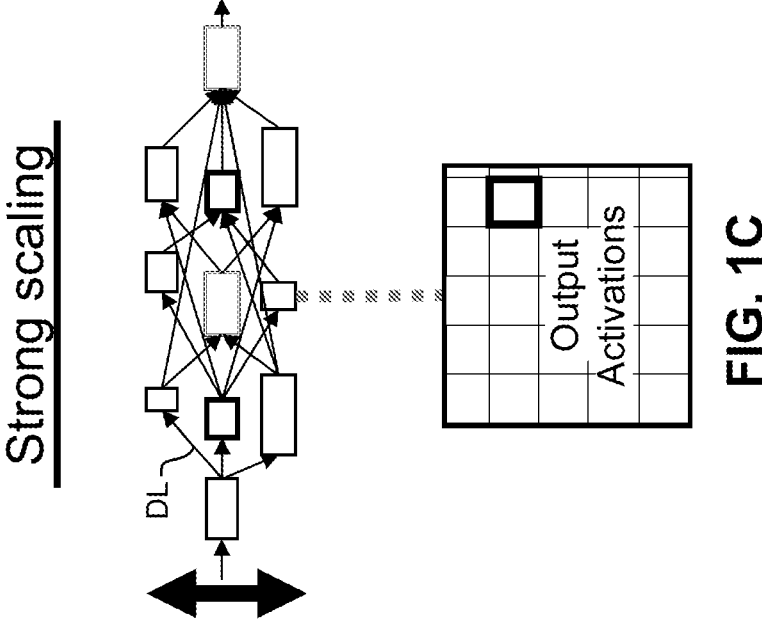
FIG. 1C shows a strong scaling deep learning scenario.
Figure 1B:
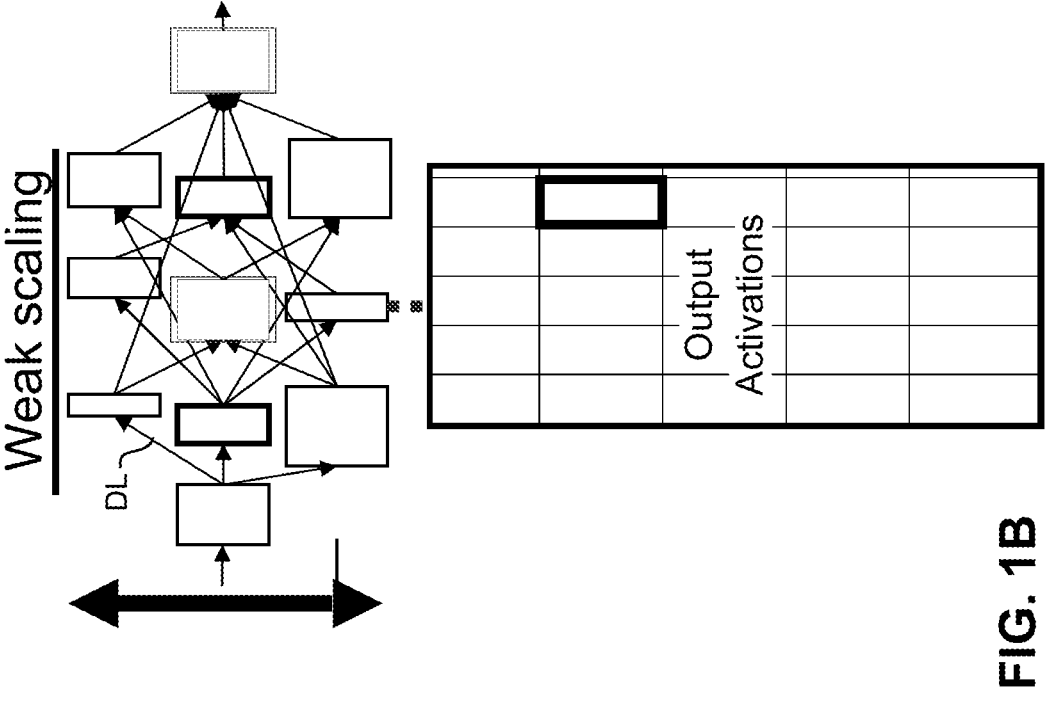
FIG. 1B shows a weak scaling deep learning scenario.

Embodiments of this disclosure support GPU performance improvements by "strong scaling" MMA computation. Strong scaling was described above in relation to FIGS. 1A-1C, and refers to GPU design improvements such that the same amount of work (compared to a previous generation of GPU) can be performed at multiple times the speed on a faster processor.

This disclosure is directed to improving the energy efficiency and performance, in computer systems, of MMA operations of the form D=A*B+C, where A, B, C and D are matrices (Equation #1). Application programs that utilize Equation #1 typically perform a number of matrix multiply operations where result (D) of one matrix multiply is used as input (C) to a subsequent matrix multiply. Some previous implementations of Equation #1 have the following characteristics:

Matrix multiplication is structured so that a set of rows of result D can be computed in parallel;

Each computational unit performs independent operations on sets of rows of result D;

Data for matrices A and B are loaded from memory into registers;

Data for matrix B is duplicated (using multiple loads from memory into registers) in each computational unit that will be doing parallel computation;

Each computational unit computes Equation #1 independently;

Data for matrices A, B and C are loaded from registers into intermediate buffers;

Multiplication and add operations are performed on data in intermediate buffer; and The result of computation (output D) is stored into registers.

The example embodiments of this disclosure improve energy efficiency and speed of MMA operations on GPUs by enabling a plurality of warps executing on a processor, such as, for example a streaming multiprocessor (SM), to cooperatively perform an MMA operation. The plurality of warps, executing on the same SM, synchronize and coordinate operations such that, for a particular MMA operation, each warp individually reads one of the A or B operands for the multiplication but the other of the A or B operands is read once from memory and shared among the plurality of warps to improve memory access efficiency. Some example embodiments include the following aspects:

Efficient synchronization of computational units that will be performing parallel computation of the MMA;

Data for matrix A and B is loaded from memory into intermediate buffers;

Data for matrix B is multicast into multiple computational units; and

Matrix B is divided into multiple sets of columns, and the math operation is performed on a set of columns instead of all the columns of matrix B.

The efficient synchronization of computational units allows for larger matrices to be computed in parallel and increases the benefit of matrix B data sharing. The loading of matrix A and B from memory into intermediate buffers removes the need to load matrix A and B from memory into registers, thereby reducing power consumed and also reducing required register allocations. The multicasting of matrix B into multiple computational units reduces the need for each computational unit performing parallel computation to independently load matrix B, thereby reducing bandwidth and power consumption. The performing of the math operation on sets of columns of matrix B allows for overlapping the math operation and loading of matrix B and also allows for reducing the required size of intermediate buffers.

In example embodiments, an independent state machine in hardware is responsible for coordinating execution of matrix multiplication in each computational unit. In some embodiments, the independent state machine performs the following tasks:

Loads data from memory (matrix A and B) into intermediate buffers;

Loads data from registers (matrix C) into intermediate buffers;

Controls execution of multiplication and add operation; and Stores the result from intermediate buffers into registers (matrix D).

The MMA operation by which a group of warps collaborate to generate a common result matrix is sometimes referred to herein as Group MMA (GMMA).

Overview of MMA

Embodiments of this disclosure provide improved MMA capabilities in GPUs and other processors.

Figure 2:
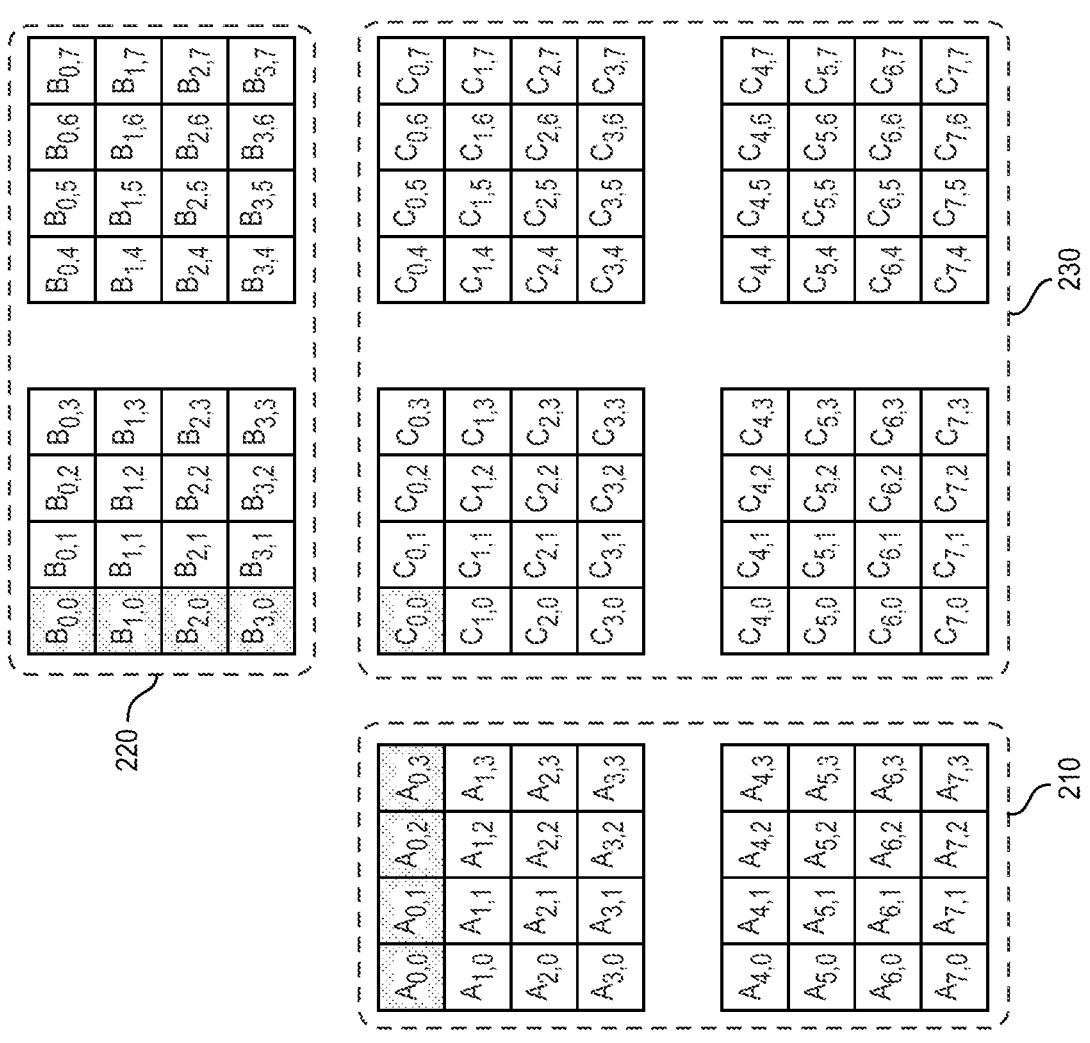
FIG. 2 shows an example input to an MMA operation.

FIG. 2 graphically illustrates an example of inputs to an MMA operation of the form D=A*B+C. The MMA operation multiplies an input matrix A 210 by an input matrix B 220, and accumulates the result in a collector matrix C 230. As shown in FIG. 2, the input matrix A is given as a 8×4 matrix, the input matrix B is given as a 4×8 matrix, and the collector matrix C is given as an 8×8 matrix. However, nothing shown in FIG. 2 should be construed as limiting the MMA operation to particular dimensions. The result matrix D is not separately shown in FIG. 2, but is, in some implementations, the same locations of the C matrix. That is, the D matrix is obtained by writing the result of A*B+C to the accumulator matrix C.

In FIG. 2, the matrices have been divided visually into 4×4 element sub-matrices. In an embodiment where each element of input matrices A 210 and B 220 is encoded as a half-precision, floating-point value (e.g., 16-bit floating point), each 4×4 element sub-matrix is represented by four 4-element vectors from the matrix. In the case of the input matrix A 210, the matrix is divided into an upper set of vectors and a lower set of vectors. Each vector may correspond to a row of the input matrix A 210, where each row of four elements can be packed into a single 64-bit register. In the case of the input matrix B 220, the matrix is divided into a left set of vectors and a right set of vectors. Each vector may correspond to a column of the input matrix B 220, where each column of four elements can be packed into a single 64-bit register. In the case of collector matrix C 230, each of the shown four 4×4 element sub-matrices may correspond to a plurality of vectors (i.e., portions of rows or portions of columns) of the collector matrix C 230, and also to a plurality of dot product operations performed using corresponding pairs of vectors from the input matrices.

For example, a first element of the collector matrix $C_{0,0}$ is generated as the result of a dot product operation between a first vector $<A_{0,0}, A_{0,1}, A_{0,2}, A_{0,3}>$ of the input matrix A 210 and a first vector $<B_{0,0}, B_{1,0}, B_{2,0}, B_{3,0}>$ of the input matrix B 220. The first vector of the input matrix A 210 represents a first row of the input matrix A 210. The first vector of the input matrix B 220 represents a first column of the input matrix B 220. Thus, the dot product between these two vectors is given as:

$$C_{0,0}=A_{0,0}B_{0,0}+A_{0,1}B_{1,0}+A_{0,2}B_{2,0}+A_{0,3}B_{3,0}+C_{0,0},$$

where the dot product operation is fundamentally the execution of four multiplication operations performed on corresponding elements of the two vectors followed by four addition operations that sum the four partial products generated by the multiplication operations along with the initial value of the element of the collector matrix. Each of the other elements of the collector matrix C 230 is then calculated in a similar manner using different combinations of the vectors of the input matrices. As shown in the MMA operation of FIG. 2, each vector of the input matrix A 210 is consumed by eight dot product operations configured to generate a corresponding row of elements of the collector matrix C 230. Similarly, each vector of the input matrix B 220 is consumed by eight dot product operations configured to generate a corresponding column of elements of the collector matrix C 230. While each of the 64 dot product operations to generate the elements of the collector matrix C 230 is unique as defined by using a different pair of vectors from the input matrices, each vector of the first input operand and each vector of the second input operand are consumed by multiple dot product operations and contribute to multiple individual elements of a result matrix.

The MMA operation described above can be accelerated by loading sets of vectors from the two input matrices into the inputs of a datapath (i.e. logic circuitry) that calculates the MMA, as long as the datapath can be configured to consume the sets of vectors in an efficient way in order to reduce the bandwidth usage between the register file and the inputs to the datapath. For example, in one embodiment, the first two rows of the upper left quadrant of collector matrix C 230 can be calculated by a datapath configured to receive the first two vectors in the upper set of vectors of the input matrix A 210 and the first four vectors of the left set of vectors of the input matrix B 220 as inputs, along with the first two vectors (i.e., rows) of the upper left quadrant of the collector matrix C 230. Such a datapath would, for example, require inputs for 8 64-bit words: two 64-bit words storing the two vectors of input matrix A 210, four 64-bit words storing the four vectors of input matrix B 220, and two 64-bit words storing the two vectors of collector matrix C 230. It should be understood that, if elements of collector matrix C 230 are encoded as full-precision, floating-point values (e.g., 32-bit floating point), then the size of the inputs to the datapath for the two vectors of collector matrix C 230 would be doubled to four 64-bit words.

The datapath can then be configured to execute the eight dot product operations in parallel in a single pass, serially in multiple passes, or some combination of serial and parallel operation. For example, the datapath can be designed to execute one 4-vector dot product operations per pass, which takes one vector from input matrix A 210 and one vector from input matrix B 220 and generates a single element of collector matrix C 230. The datapath is then operated over 8 passes utilizing different combinations of the 6 vectors from the two input matrices over the eight passes to generate eight different elements of the collector matrix C 230. Alternatively, the datapath can be designed to execute four 4-vector dot product operations per pass, which takes one vector from input matrix A 210 and four vectors from input matrix B 220 and generates four elements of collector matrix C 230 in parallel. The datapath is then operated over two passes utilizing different vectors from input matrix A 210 and the same four vectors from input matrix B 220 during each pass to generate the eight elements of the collector matrix C 230. It will be appreciated that the inputs of the datapath may be loaded from the register file once prior to multiple dot product operations being executed by the datapath using different combinations of inputs in each dot product operation. This will reduce the bandwidth consumed between the register file and the datapath significantly. For example, only 6 vectors of the two input matrices A and B need to be loaded from the register file into the inputs of the datapath in order to perform 8 dot product operations, whereas performing all eight dot product operations individually using a datapath capable of performing a single dot product operation and only having an input capacity for two vectors would require 16 vectors to be loaded from the register file to the inputs of the datapath as the vectors are reused in multiple dot product operations.

It will be appreciated that the size of matrix elements is not limited in example embodiments. It will also be appreciated that the size of the input matrices are not limited in example embodiments. U.S. Pat. No. 10,338,919, already incorporated by reference, describes packing matrix elements of different sizes into registers, and also describes implementing MMA of input matrices of arbitrary K dimension where the input matrices A and B are of N×K and K×M dimensions.

Figure 3:
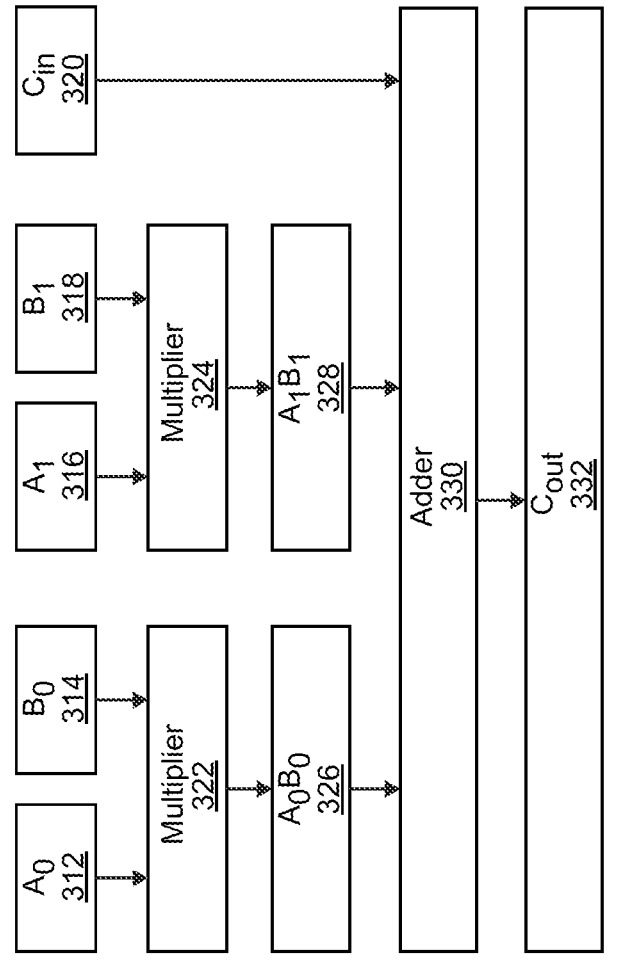
FIG. 3 is a conceptual diagram of a dot product operation, in accordance with one embodiment.

FIG. 3 is a conceptual diagram of a MMA operation, in accordance with one embodiment. The operation, in essence, sums a plurality of partial products. The MMA operation may specify three operands, a vector A, a vector B, and a scalar collector C. The vector A and the vector B have the same length (i.e., number of elements). As shown in FIG. 3, the length of the vectors A and B is given as two; however, it will be appreciated that the dot product operation may have any length greater than or equal to two.

The MMA operation multiplies a pairs of elements from the input vectors A and B. As shown in FIG. 3, a first element $A_0$ 312 from input vector A is multiplied by a corresponding element $B_0$ 314 from input vector B in multiplier 322 to generate a partial product $A_0B_0$ 326. A second element $A_1$ 316 from input vector A is multiplied by a corresponding element $B_1$ 318 from input vector B in multiplier 324 to generate a partial product $A_1B_1$ 328. A three element adder 330 is then utilized to sum the partial product $A_0B_0$ 326, the partial product $A_1B_1$ 328, and the scalar collector value $C_{in}$ 320 to generate the result value $C_{out}$ 332. The result value $C_{out}$ 332 may be stored in the register for the scalar collector value $C_{in}$ 320 and reused to accumulate multiple dot product operations for longer vectors.

FIG. 3 is merely an example implementation, and example implementations are not limited to the size of input vectors shown in FIG. 3. It will be understood that the MMA operation can be expanded by adding additional multipliers 322, 324, etc. in parallel to calculate additional partial products and then summing the additional partial products with either a larger element adder or a tree of smaller adders that generate intermediate sums that are then summed again by an additional multi-element adder.

Example Datapath for MMA

Figure 4:
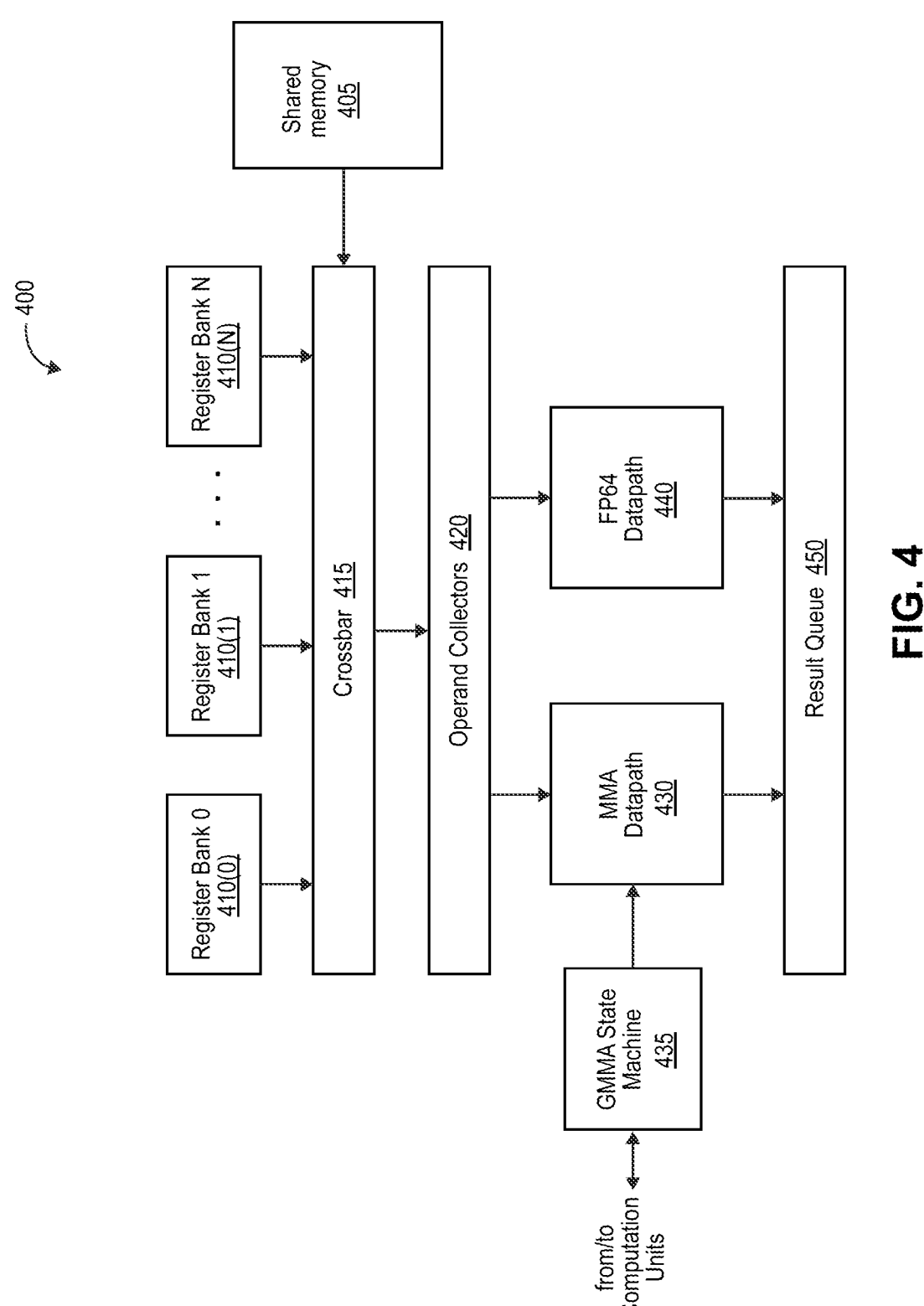
FIG. 4 illustrates a portion of a processor that includes a datapath configured to implement matrix operations according to some embodiments.

FIG. 4 illustrates a portion of a processor that includes a datapath configured to implement matrix operations according to some embodiments. The portion of a processor 400 includes a datapath 430 configured to implement matrix operations.

The processor 400 includes a multi-bank register file implemented as a plurality of register banks 410. Each register bank 410 may store a plurality of data words in a plurality of registers. Each register bank 410 may have a separate and distinct read and write port such that one register in the register bank 410 may be read and another register may be written in any given clock cycle. Consequently, one data word may be read from each register bank 410 simultaneously during a single clock cycle and loaded into the operand collectors 420. The register file is configured to store operands specified in an instruction for the MMA operation. In one embodiment, each operand specified in the instruction is a matrix having a plurality of elements in a two dimensional array of rows and columns, and each register may store one or more elements of a particular operand depending on the sizes of the elements and/or the registers.

The processor 400 also includes a plurality of operand collectors coupled to an input of one or more datapaths. Various technologies, such as, for example, flip-flops, for implementing the operand collectors are described in U.S. Pat. No. 10,338,919. The plurality of operand collectors 420 may be loaded with operands from the register file over a number of clock cycles before multiple operands are provided to the inputs of a datapath in parallel during a single clock cycle. The function of the operand collectors 420 is to store, temporarily, the operands required to execute an operation on a datapath, where the operands can be loaded from the register file 410 over one or more clock cycles depending on which register banks 410 the operands are stored in and how many read ports are available in those register banks 410.

A crossbar 415 or other type of switchable interconnect may be coupled to the read ports of the register banks 410 and the inputs of the operand collectors. The crossbar 415 can be configured to route the signals from a read port associated with any of the register banks 410 to a particular operand collector 420. The crossbar 405 also enables operands to be loaded to the operand collectors directly from shared memory, without first being stored to the register file.

The operand collectors 420 may be coupled to the inputs of one or more datapaths. As shown in FIG. 4, the operand collectors 420 may be coupled to a matrix multiply accumulate (MMA) datapath 430 as well as a double-precision (64-bit), floating-point (FP64) datapath 440. The FP64 datapath 440 may be a conventional double-precision, floating-point FMA datapath that enables addition, subtraction, multiplication, division, as well as other operations to be performed on double-precision, floating-point operands.

The result queue 450 enables the result to be stored temporarily while waiting for the availability of a write port to write the value back to the register file. It will be appreciated that the result queue 450 may be in addition to an accumulation register included internally in the datapath that does not need to be written back to the register file between the executions of multiple instructions.

In one embodiment, the MMA datapath 430 shares the same operand collectors 420 available to the FP64 datapath 440. The MMA datapath 430 and FP64 datapath 440 may be included in a common core of the processor 400, the processor 400 including a plurality of cores that each includes one FP64 datapath 440 and MMA datapath 430 as well as, possibly, an integer arithmetic logic unit (ALU). In one embodiment, the MMA datapath 430 is configured to execute a matrix multiply and accumulate (MMA) operation. An instruction for the MMA operation specifies a plurality of matrix operands configured to execute an operation equivalent to the function specified by Equation 1, set forth above.

In one embodiment, the plurality of operand collectors 420 include storage for at least two vectors of a first operand specified in the instruction (i.e., input matrix A 210) and at least two vectors of a second operand specified in the instruction (i.e., input matrix B 220). Each vector of the at least two vectors having at least two elements in a row or column of the matrix operand. For example, in one embodiment, the MMA datapath 430 is configured to receive two vectors from a first operand and four vectors from a second operand as inputs to the datapath. Consequently, the number of operand collectors 420 should be sufficient to store at least six vectors of the two input matrix operands (e.g., a minimum of six 64-bit operand collectors). Other embodiments may require more or less operand collectors 420 depending on the design of the MMA datapath 430.

In one embodiment, the MMA datapath 430 is also configured to receive at least two vectors of a third operand specified in the instruction (i.e., collector matrix C 230). The collector matrix C 230 is summed with the result of the multiplication of the first and second operand specified in the instruction.

The MMA datapath 430 generates a plurality of elements of a result matrix at an output of the MMA datapath 430. Each element in the plurality of elements of the result matrix is generated by calculating at least one dot product of corresponding pairs of vectors selected from the matrix operands.

In some embodiments, a GMMA state machine hardware circuitry 435 controls operand loading to operand collectors 430 and synchronizing of multiple warps using the datapath 430 to perform an MMA operation.

In one embodiment, the processor 400 is implemented as the PPU 1000. In such an embodiment, each core 1250 in an SM 1140 includes an MMA datapath 430 as well as an FP64 datapath 440 and, optionally, an integer ALU. Register file 1220 may implement the one or more memory banks 410. The crossbar 415 and operand collectors 420 may be implemented between the register file 1220 and the one or more cores 1250. Furthermore, the result queue 450 may be implemented between the one or more cores 1250 and the interconnect network 1280, which enables the result stored in the result queue 450 to be written back to the register file 1220. Consequently, the processor 400 is a PPU 1000 comprising a plurality of SMs 1140, each SM 1140 in the plurality of SMs 1140 including the register file 1220 and a number of cores 1250, each core 1250 in the number of cores 1250 including an instance of the MMA datapath 430.

The PPU 1000 implements a SIMT architecture that enables a number of threads to be executed in parallel on a plurality of cores 1250 in a number of SMs 1140. In one embodiment, the MMA operation is configured to be executed by a number of threads in parallel on a number of cores 1250. Each thread is configured to generate a portion of the elements in the result matrix (e.g., collector matrix C 230) on a particular core 1250 using different combinations of the vectors of the operands specified in the instruction for the MMA operation.

For example, as shown in FIG. 2, an MMA operation on an 8×4 input matrix A 210 and a 4×8 input matrix B 220 can be executed on eight threads simultaneously. A first thread is assigned the first two vectors (e.g., $<A_{0,0}, A_{0,1}, A_{0,2}, A_{0,3}>$ & $<A_{1,0}, A_{1,1}, A_{1,2}, A_{1,3}>$) of input matrix A 210 and the first four vectors (e.g., $<B_{0,0}, B_{1,0}, B_{2,0}, B_{3,0}>$, $<B_{0,1}, B_{1,1}, B_{2,1}, B_{3,1}>$, $<B_{0,2}, B_{1,2}, B_{2,2}, B_{3,2}>$, & $<B_{0,3}, B_{1,3}, B_{2,3}, B_{3,3}>$) of the input matrix B 220. The first thread generates eight elements included in two vectors of the result matrix (e.g., $<C_{0,0}, C_{0,1}, C_{0,2}, C_{0,3}>$ & $<C_{1,0}, C_{1,1}, C_{1,2}, C_{1,3}>$). Similarly, a second thread is assigned the first two vectors (e.g., $<A_{0,0}, A_{0,1}, A_{0,2}, A_{0,3}>$ & $<A_{1,0}, A_{1,1}, A_{1,2}, A_{1,3}>$) of input matrix A 210 and the next four vectors (e.g., $<B_{0,4}, B_{1,4}, B_{2,4}, B_{3,4}>$, $<B_{0,5}, B_{1,5}, B_{2,5}, B_{3,5}>$, $<B_{0,6}, B_{1,6}, B_{2,6}, B_{3,6}>$, & $<B_{0,7}, B_{1,7}, B_{2,7}, B_{3,7}>$) of the input matrix B 220. The second thread generates eight elements included in two different vectors of the result matrix (e.g., $<C_{0,4}, C_{0,5}, C_{0,6}, C_{0,7}>$ & $<C_{1,4}, C_{1,5}, C_{1,6}, C_{1,7}>$). A third thread is assigned the next two vectors (e.g., $<A_{2,0}, A_{2,1}, A_{2,2}, A_{2,3}>$ & $<A_{3,0}, A_{3,1}, A_{3,2}, A_{3,3}>$) of input matrix A 210 and the first four vectors (e.g., $<B_{0,0}, B_{1,0}, B_{2,0}, B_{3,0}>$, $<B_{0,1}, B_{1,1}, B_{2,1}, B_{3,1}>$, $<B_{0,2}, B_{1,2}, B_{2,2}, B_{3,2}>$, & $<B_{0,3}, B_{1,3}, B_{2,3}, B_{3,3}>$) of the input matrix B 220. The third thread generates eight elements included in two vectors of the result matrix (e.g., $<C_{2,0}, C_{2,1}, C_{2,2}, C_{2,3}>$ & $<C_{3,0}, C_{3,1}, C_{3,2}, C_{3,3}>$). The other five threads do similar with additional combinations of vectors from the input matrix A 210 and the input matrix B 220. In another embodiment, a control entity such the state machine described below, controls the execution of the MMA operation based on input from the register files of the threads or shared memory and by writing respective portions of the result matrix to the register files of the respective threads.

It will be appreciated that a core 1250 is allocated to each thread, the vectors assigned to that thread are loaded into the operand collectors 420 for the core 1250, and the elements of the result matrix are then generated by executing the MMA operation on the MMA datapath 430 in the core 1250. In one embodiment, each core is coupled to a dedicated set of operand collectors 420 only coupled to that core 1250. In another embodiment, a plurality of cores 1250 share operand collectors 420. For example, two cores 1250 having two MMA datapaths 430 could share a set of operand collectors 420, where common vectors assigned to two threads being scheduled on the two cores 1250 are shared by both cores 1250. That way, the common vectors assigned to two or more threads are not loaded into two separate sets of operand collectors 420. For example, the first two threads discussed above are both assigned the first two vectors of input matrix A 210 while being assigned different sets of vectors of input matrix B 220. Thus, the operand collectors 420 being used to store the vectors of the input matrix A 210 could be shared between two cores 1250 by coupling those operand collectors 420 to the inputs of both MMA datapaths 430.

Example MMA Implementations In GPUs

Figures 5A, 5B, 5C:
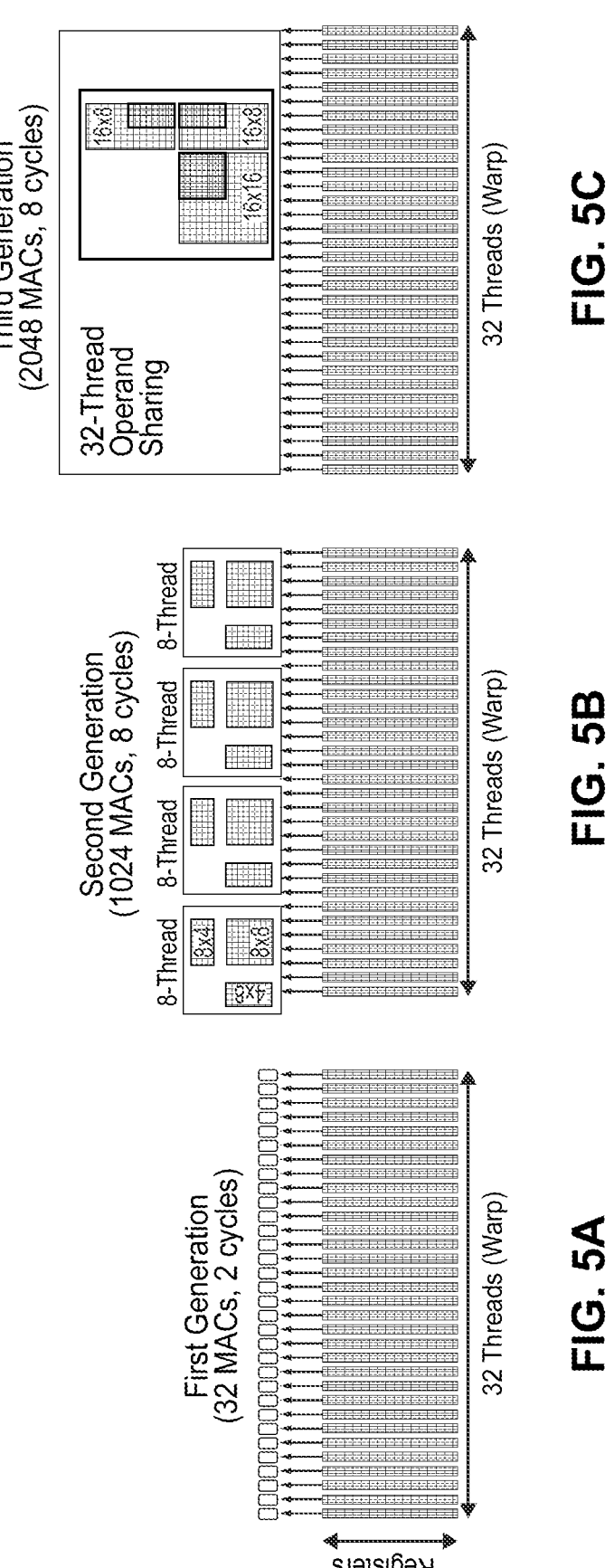
FIGS. 5A-5C illustrate example evolution of some MMA capabilities over three generations of previous GPUs.

FIG. 5A-5C illustrates example evolution of some MMA capabilities over three generations of previous GPUs. In the example shown in FIG. 5A, a streaming multiprocessor (SM) in a first (of the examples shown) generation GPU supported the simultaneous scheduling and execution of a group or block of execution threads referred to as a "warp". In particular, a scheduler within or associated with the SM launched a certain number (e.g., 32) of threads at the same time for execution—this collection of threads being referred to as a "warp." However, in the first generation of SM, each thread of a warp individually performed any MMA operation using its own register files and without sharing its register files with any other threads in the warp. Each thread thus operated independently in executing instructions on the datapath.

The second generation GPU shown in FIG. 5B introduced some degree of data sharing between simultaneously executing threads in a warp. In particular, the threads of a warp worked in groups of a certain subset (e.g., 8) of threads in the warp to share their register files and cooperatively perform MMA. That is, each warp comprised multiple (e.g., 4) subsets, and each subset utilized a respective datapath circuitry to cooperatively perform a MMA. In one example, a warp still comprised total 32 threads, and each datapath circuitry in the second generation catered to an 8-thread group and was configured to perform multiplication of a 8×4 A matrix and 4×8 B matrix. Within an 8-thread group, the data for the B matrix, for example, could be obtained from memory by one thread and be shared via a local register file and datapath with the other threads in the same group. However, data sharing between such groups or subsets of threads in the same or different warp required writing to and reading from higher levels of memory such as the L2 cache. Although the 8×4 matrix A information that is shown in each of the four groups in the figure may be the same for all four groups, each group loads this information on its own from its own associated register files. More specifically, a thread could load the operand information from the register files of any other thread in the same group but not necessarily from any other thread in the same warp. Thus, each of the respective groups potentially would issue its own read requests for the same data, wasting register file bandwidth.

The third generation GPU shown in FIG. 5C extended the local sharing of data to all threads in the warp. Thus, in this third generation, all threads in a single warp can cooperate to perform MMA by sharing operands from their respective registers. That is, a thread in a warp can obtain operands for its datapath operation from the registers of any thread in that warp. Thus, for example, this generation enables each warp to perform an MMA of a 16×16 matrix and a 16×8 matrix by having all its threads (e.g. 32 threads) collaborate with respect to the MMA.

Figure 6A:
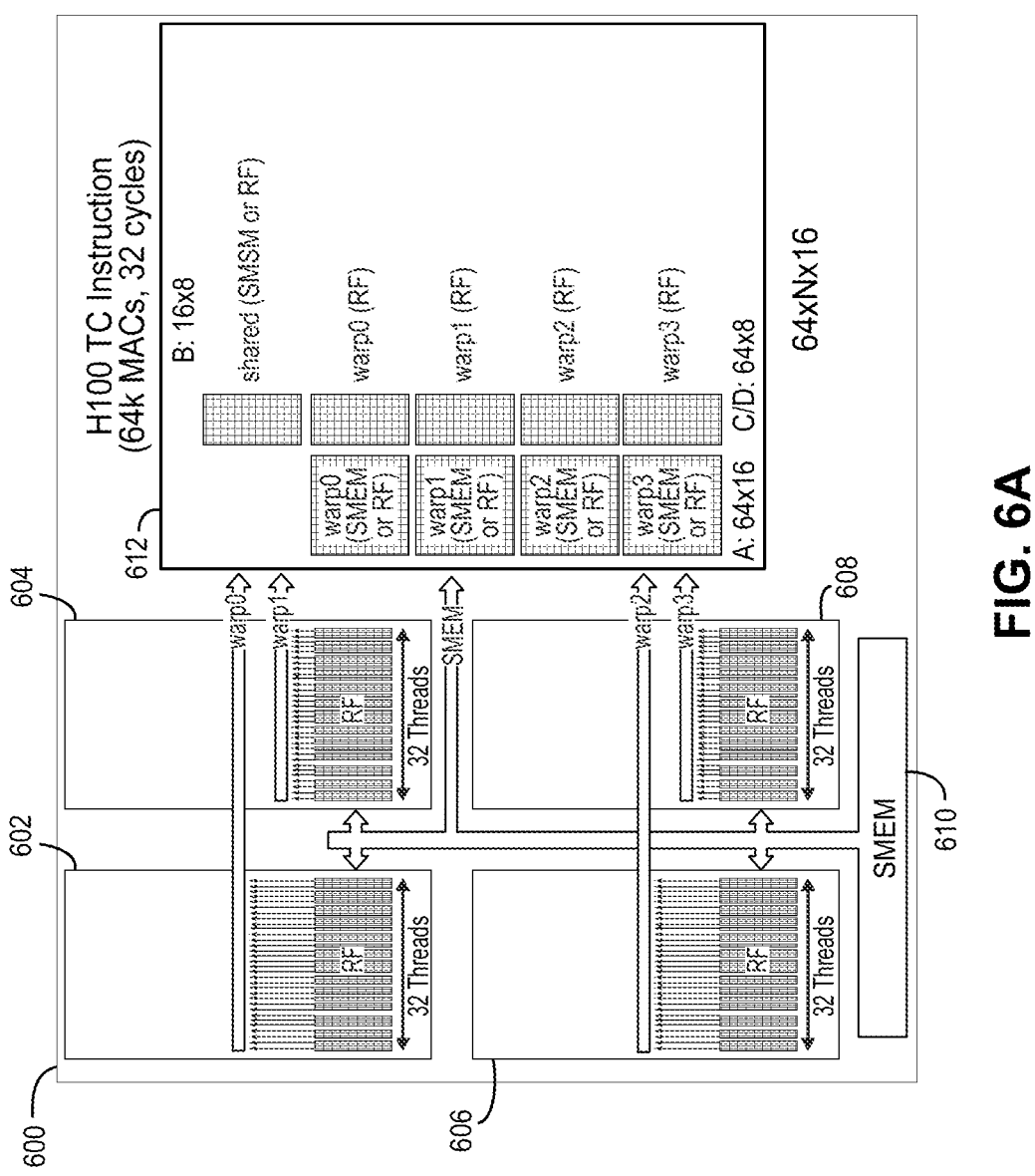
FIG. 6A illustrates a conceptual view of a streaming multiprocessor in accordance with some example embodiments.

FIG. 6A illustrates a conceptual view of a streaming multiprocessor (SM) in accordance with some example embodiments. Improving upon the third generation shown in FIG. 5C, the illustrated example embodiment enables a plurality or group of warps to cooperate in the calculating of an MMA of the form A*B+C. As noted above, the MMA operation for computing a common a result matrix may be referred to as a GMMA operation. SMs are described below, for example, in relation to FIGS. 12A and 12B.

FIG. 6A illustrates four warps—warp 0, warp 1, warp 2 and warp 3 executing on subpartition 0 602, subpartition 1 604, subpartition 2 606 and subpartition 3 608 of SM 600 respectively—cooperating to calculate A*B+C where C calculated for the group is a 64×8 result matrix. Any number of warps, each comprising any number of threads, could cooperate in this way. In one embodiment, all of the plurality of warps execute on the same SM and are all launched at the same time. The four warps, which may be launched and execute on different subpartitions of the SM 600, collaborate such that all threads of all four warps share their register files with one another to perform the MMA for the 64×8 A matrix and 8×16 B matrix shown in FIG. 6A in the tensor cores 612 of the SM. The SM may have a sufficient number of tensor cores such that each thread can be allocated its own respective tensor sore. Thus, tensor cores 612 may include a respective core for each thread (e.g., 128 tensor cores corresponding to 128 threads, with each of the four warps having 32 threads). In one embodiment, output accumulators that accumulate the C matrix are allocated among the four warps so that each warp writes its respective results to its own respective set of allocated accumulators. As an illustrative example, FIG. 12B shows an SM having four subpartitions 1291, 1292, 1293 and 1294.

The present embodiments thus have the capability to share MMA operands from register files across different warps. The A and/or B operands shown in the figure can be obtained to the relevant datapath from register files of any thread of the group of warps and/or from shared memory. The B operand, as illustrated in the figure, is shared across all four warps. In some embodiments, the B operand is read once from external memory to the shared memory accessible to the warps of a group of warps, and that B operand data is read directly from the shared memory and sent directly, for example, by multicast, to processing cores of threads of that warp. The set of processing cores to which the data is multicast may be only a subset, or alternatively even all, of the processing cores that are associated with (e.g., that are located on the same SM as) the shared memory.

As can be observed in this example, while each warp operates on its own set of A matrix data, all four (or other number of) warps operate on the same set of B matrix data. Data that was read multiple times (such as the B matrix data) into each warp's register files in the previous generation, now needs to be read only once in the example embodiments—thereby improving memory bandwidth utilization. The A matrix data, being unique to each warp, may be obtained directly from the shared memory to the datapath, bypassing the register file.

Figure 6B:
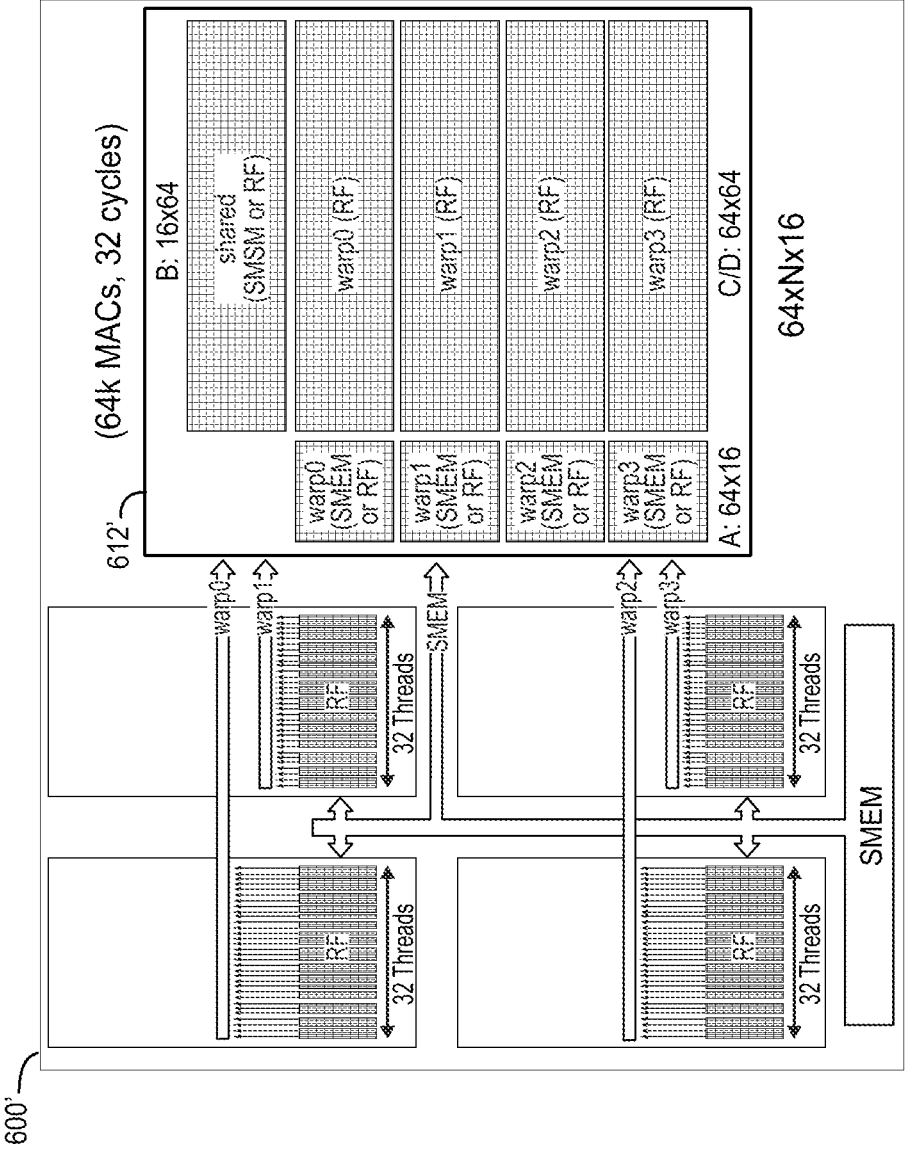
FIG. 6B illustrates a similar conceptual view to FIG. 6A, but where the group of warps cooperate to calculate variable-sized matrices according to some embodiments.

FIG. 6B illustrates a conceptual view of SM 600' that is similar to FIG. 6A, but where the group of four warps work together to calculate variable-sized matrices. Some example embodiments include the capability for a configurable or variable A matrix and B matrix sizes, For example, in one embodiment, the A matrix is 64×K and the B matrix is K×16, where K can be any positive number such as, for example, 8, 16, 32, 64, 128, etc. Since the B matrix, which is K×16, is shared among all warps (see tensor cores 612'), the higher K leads to higher gains in efficiency. The illustrated embodiment provides for the MMA of 64×K and K×64 matrices, as an example.

As illustrated in FIGS. 6A and 6B, the SM includes four sub-partitions in some embodiments, and each sub-partition can host one of the concurrently executing warps in the group cooperating to perform a GMMA operation.

Hardware State Machine

Figure 7A:
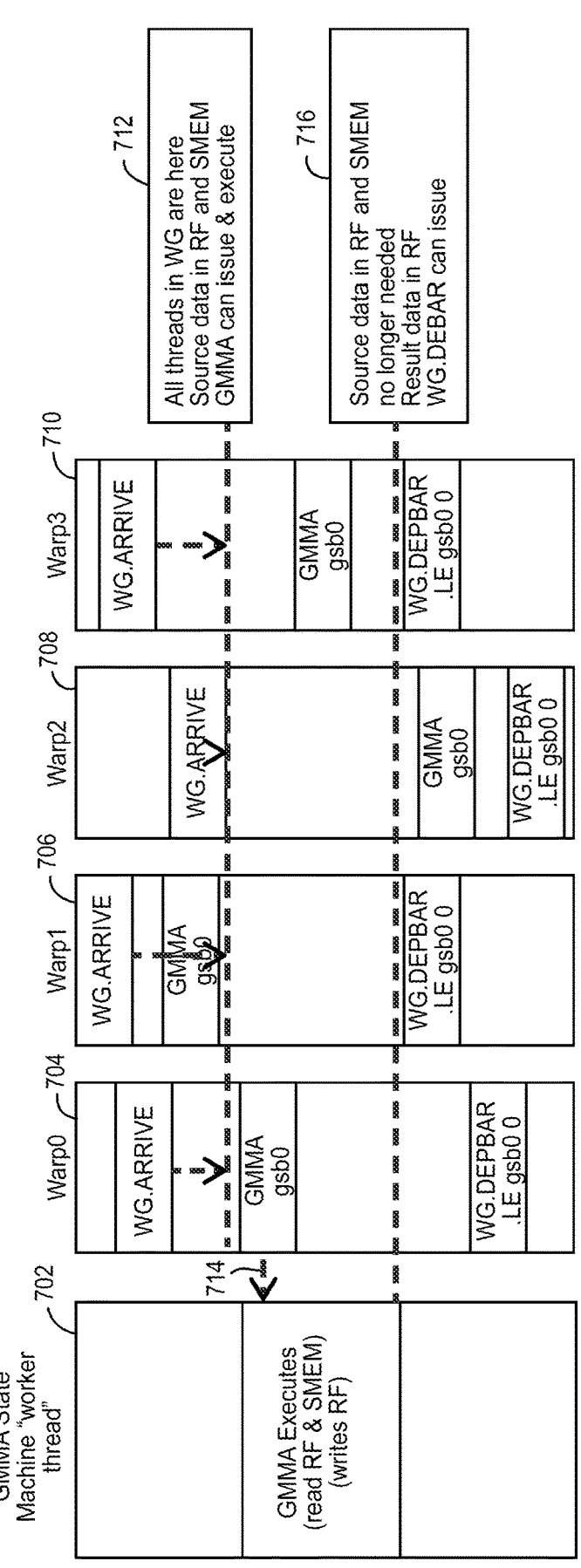
FIG. 7A illustrates an example flow of events, involving a group of warps and an MMA state machine hardware circuitry, in an example system to execute an MMA in accordance with some embodiments.
Figure 7B:
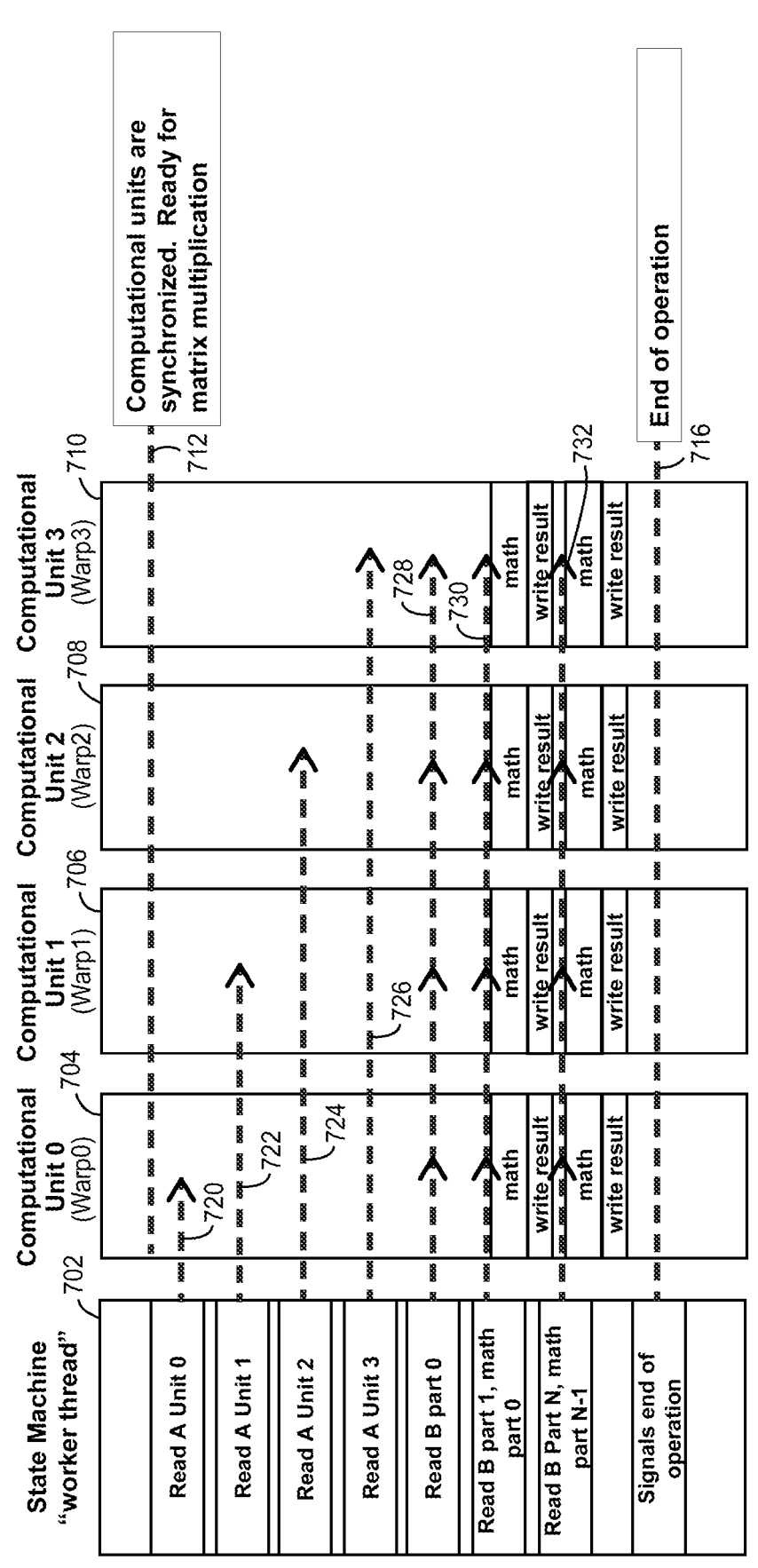
FIG. 7B illustrates another conceptual view of the synchronization involved in the process shown in FIG. 7A, and more details of the MMA state machine operations according to some embodiments.

FIGS. 7A and 7B illustrate an example flow 700 of events in an example system executing a GMMA operation in accordance with some embodiments. A state machine, or "worker thread", 702 is implemented in hardware (as logic circuitry) to control the GMMA operation between a group of warps executing on a processor, such as, for example, an SM, to collaboratively calculate a result matrix. It should be noted that the illustrated event flow represents the programming model of the GMMA operation.

In the illustrated example, the state machine 702, controls a plurality (e.g., four) computational units 704, 706, 708 and 710 to perform the GMMA operation. In some embodiments, the four computational units may represent four subpartitions of an SM such as SM 1140. Each subpartition may have one or more tensor cores (see FIG. 12B) that are configured to perform the multiplication and other operations on matrices. In the example, a respective warp of the group of warps collaboratively calculating a result matrix executes on each computational unit.

Each one of the threads in each warp of the group of warps, executing on a respective computational unit 704, 706, 708 and 710 is a separate program executing asynchronously with the other threads of the warp and synchronizing with the other threads at defined synchronization points. In some embodiments, a thread in the group of warps initiates the state machine 702 to start execution of a GMMA instruction on respective tensor cores. Each thread of the group of warps contributes its operands, for example, from its register file to the GMMA operation and receives results of the GMMA operation in its register file. The state machine 702 moves operand data from the register file and/or shared memory to the inputs of the datapath, controls respective tensor cores to execute the GMMA operation using the operands in the inputs to the datapath, and subsequently writes the results of the operation back to the register file. Each thread can then access the results in its register file.

In order to efficiently share operands by, for example, multicast, so that each thread in each warp in the group can contribute operands to its portion of the GMMA, a synchronization mechanism is implemented. The threads in the group arrive at a first synchronization barrier 712, and when, based on the barrier, it is determined that all threads in all the group's warps have arrived at the barrier. All threads arriving at the first synchronization barrier 712 indicate that the input data provided by each of the threads is ready (e.g. in the register file and/or shared memory). Responsive to all threads of the group of warps arriving at the first synchronization barrier, the state machine 702 is signaled 714 to start on the math operations of the GMMA operation.

The state machine 702 will then move the input operands to the inputs of the datapath as required, and perform the GMMA operation. Once the operation is complete, the threads are notified by the state machine 702 that the GMMA operation is complete, thereby causing the threads to read the results from the register files.

This state machine driven GMMA operation involves having threads coordinate across multiple warps that are ostensibly independently executed synchronized by this asynchronous unit that will perform the GMMA operation all together all at once in order to maximize the efficiency of the multicast.

FIG. 7B illustrates another conceptual view 700' of the synchronization involved in the process shown in FIG. 7A, and more details of the state machine 702.

After the state machine is started upon the conditions for the thread arrive barrier (e.g., the first synchronization barrier referred above) being satisfied 712 by every warp in the group of warps, the state machine 702 causes respective processing cores (e.g., tensor cores and/or datapaths) to perform the GMMA math operations before identifying the end 716 of the GMMA operation. The state machine reads the input operands for respective parts of matrix A to the inputs of respective processing cores. For example, operations 720, 722, 724 and 726 read computational units 0, 1, 2 and 3, respectively. Subsequently, the state machine 702 reads the B matrix over several instructions 728, 730 and 732, and the same data from the B matrix is provided to all the computational units (e.g., SM subpartitions).

In some embodiments, the state machine may pipeline performing math operations with register/shared memory loads and/or writes in order to improve latency and bandwidth utilization. For example, as shown in the figure, the reading of B may be performed concurrently with one or both of performing math operations and writing of results. With each instruction, math associated with a part of the result matrix may be calculated, and the result written. The illustrated embodiment, required at least two (730 and 732) operations of the group of warps collaborating to calculate parts of the result matrix to complete the math operations required for calculating the entire result matrix. The state machine 702 may control the synchronization for calculating the respective parts by updating a synchronization barrier upon completion of each part, and thereby alerting all the threads so that the threads can proceed to provide the data for the calculation of another part. The end of the calculation of the entire matrix can be signaled by the state machine updating another synchronization barrier. In some embodiments, an instruction stream executed by the plurality of warps may include the MMA instruction and a MMA synchronization instruction that is arranged after the MMA instruction in the instruction stream, the MMA synchronization instruction indicates a completion of some or all previous MMA instructions to the plurality of warps. In some embodiments, the MMA synchronization instruction updates a synchronization barrier to indicate the completion of one or more MMA instructions, or the completion of all of the MMA instructions that have been issued, to the plurality of warps.

The state machine 702 is hardware circuitry, and operates asynchronously with the subpartitions or more specifically the processing cores in the respective subpartitions. Thus each thread can continue to perform its activity while waiting for the state machine to perform some of the math operations. The instructions executed by one or more of the threads trigger the state machine hardware 702, and all the work done by the state machine is in state machine hardware.

Example embodiments may utilize a math instruction, referred to herein as a GMMA instruction, to perform the GMMA operation. In an example, embodiment the GMMA instruction may be of the form <instruction opcode><input matrix A, size, location><input matrix B, size, location><input matrix C, size, location><descriptor>. The GMMA instruction may read operands from the register file, or directly from shared memory. In order for the GMMA instruction to efficiently read directly from shared memory, the instruction may be provided with a descriptor field that identifies a predetermined format in which the matrix or matrices being read are stored in memory (layouts of the respective input matrices in memory).

The descriptor field may specify a register index, and the register may be configured with a bit pattern of one or more bits to indicate a particular predetermined pattern of layout selected from a plurality of possible layouts. In some embodiments, the location of the data in shared memory and also the layout is specified using the descriptor. In some embodiments, the descriptor may be used to provide additional information such as transpositions, leading edge calculations, strides etc. that are to be used in obtaining the data from the memory and loading to the datapath.

Using the descriptor, the GMMA instruction provides for the matrix data to be accessed in memory according to the layout specified by the descriptor. Upon being retrieved, the data may be partially transformed when written to shared memory, and then optionally further transformed while being written to the datapath.

The "worker thread" is a concept that exposes the state machine to the programming model. The state machine (e.g. state machine 702) "understands" both the layout of the data in the shared memory, which is specified in the descriptor of the GMMA instruction, and the organization of the data in the datapath, and is able to do the necessary one or more transformations, transpositions and/or translation in hardware to get the data in to the datapath in the organization required by the datapath.

The descriptor field is an efficient way to support the various swizzle patterns in which data is organized. By specifying a pattern of organization for multiple 16×16 blocks in a descriptor, a necessity to specify the location of individual blocks is avoided. The descriptor allows to bridge the difference between the input data from global memory and the submatrices that ultimately feed to the tensor core datapath. According to some embodiments, the descriptor field includes information that enables the GMMA state machine to, in response to a single GMMA instruction, proceed to access the register files and/or shared memory over multiple cycles to load input operands and to pipeline math operations on the tensor cores and operand loading for the respective threads participating in the GMMA operation. Thus, in some embodiments, the descriptor field is used by the GMMA state machine to, based on a single GMMA instruction in the instruction stream, control the calculation of an entire GMMA operation irrespective of the sizes of the input matrices.

The synchronization with respect to the GMMA operation may, in some embodiments, be implemented in accordance with one or more techniques described in the concurrently filed U.S. application Ser. No. 17/691,296: Hardware Accelerated Synchronization Mechanism With Asynchronous Transaction Support), which is herein incorporated in its entirety by reference.

Figure 8:
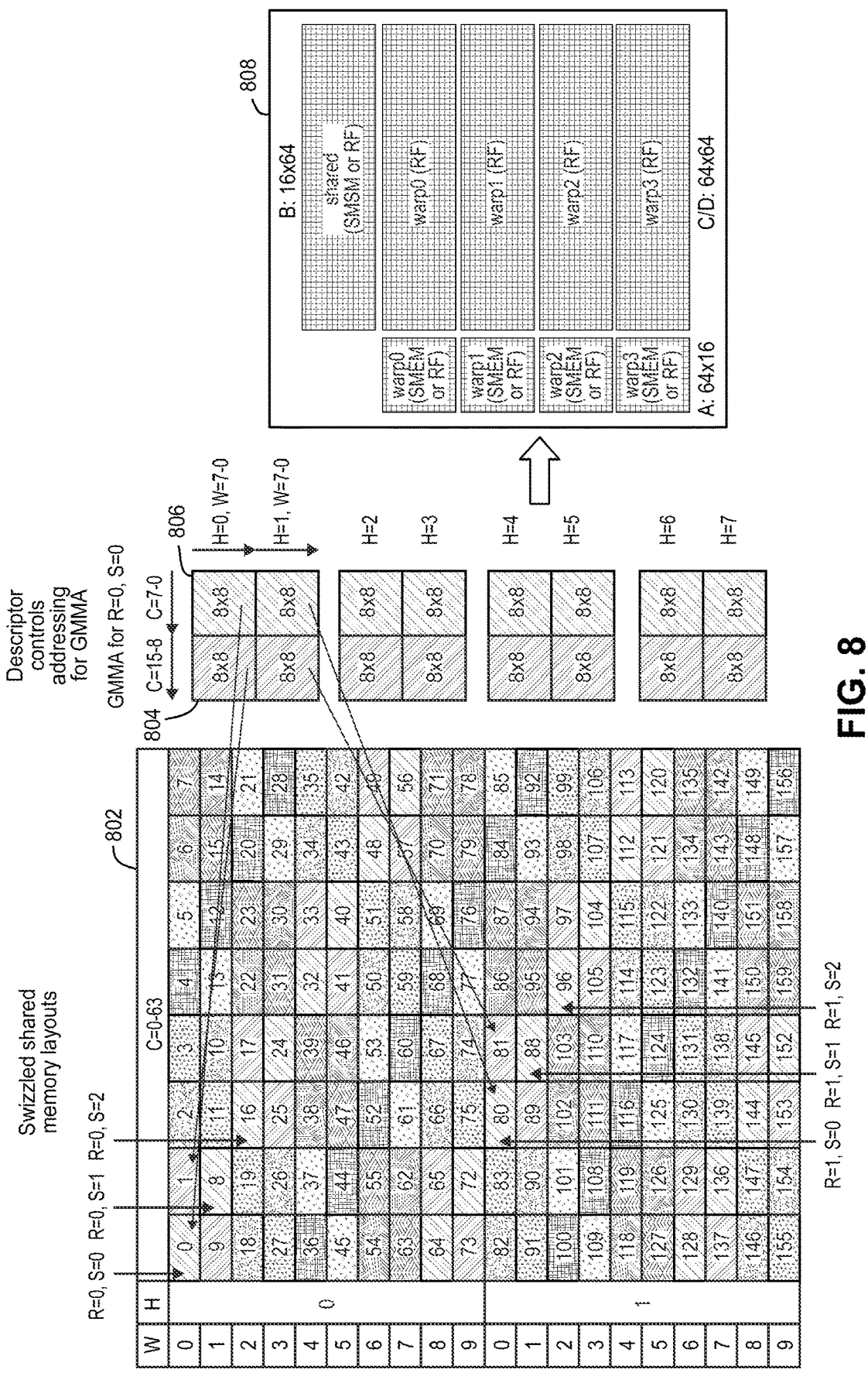
FIG. 8 illustrates data stored in a swizzled pattern in memory, which is read by an MMA instruction according to some embodiments.

FIG. 8 illustrates data stored in a swizzled pattern 802 in shared memory, which may be read by the GMMA state machine and/or participating threads. The swizzle pattern 802 is how the data read from the global memory or L2, which may be in row major form, is stored in the shared memory so that it can be read in a column major pattern 804 and 806 for the datapath 808, while minimizing or eliminating bank conflicts when the data is read from the shared memory.

In some embodiments, in response to a GMMA instruction, the GMMA state machine and/or a thread may cause the TMAU unit 112 (see FIG. 11A) to load the input data from external memory or L2 to shared memory. Concurrently filed U.S. application Ser. No. 17/691,276, which is hereby incorporated by reference in its entirety, describes the TMAU unit 112 and the associated swizzle patterns and bulk movement of block data to/from shared memory.

In many applications, the TMAU loads data in the shared memory in the same order as they are laid out in global memory. However, there are applications when extra data movements are required to avoid performance degradation. The TMAU supports a non-swizzled mode in which data is written to the shared memory in the same arrangement it is in global memory, and a swizzled mode in which data is written to shared memory in accordance with a predetermined or configurable swizzle pattern that that results in a different arrangement of the data than that in the global memory.

The swizzling accommodates for implementations in which the order in which data is stored in global memory is not the same order in which that data is stored in shared memory. When the data is moved from global memory to shared memory, in some embodiments the TMAU provides for scrambling the data because the SM, for some applications, reads the data vertically (e.g. in columns of data). Moreover, the memory bank layout in the shared memory is taken into account by the TMAU, when it is writing to shared memory, in order to optimize the SM's subsequent read access to that data. In the illustrated example, the shared memory is organized in banks, and specifically in 8 banks. At any given clock, each bank is read but only a small piece of data from any given bank can be read. In the figure, each hatch pattern represents data written to a different bank in the shared memory in accordance with the swizzle pattern for the tensor. If the data from H=0 W=0-7 is to be read from shared memory and if that data in the shared memory is arranged in the same manner as in the global memory, it would take 8 clock cycles to read that data while avoiding bank conflict. Thus, as shown in FIG. 8 on the left side 802, the data from H=0 W=0-7 is spread over all eight banks in the shared memory so that all of that data (i.e. the data from H=0 W=0-7) can be read in parallel across the 8 banks. This increases the data throughput per clock.

To the right of the swizzle pattern in FIG. 8, the further column 806 shows the 8×8 tiles for each H when W=0, the arrows indicating the locations in shared memory at which the tiles for H=0, W=0 and H=1, WO (enumerated tiles 0 and 80 respectively) are written. Similarly, in the nearer column to the swizzle pattern 804, the 8×8 tiles for each H when W=1 are shown, the arrows indicating the locations in shared memory at which the tiles for H=0, W=1 and H=1, W=1 (enumerated tiles 0 and 80 respectively) are written The GMMA circuitry may be configured in some embodiments to read data from shared memory in 8×8 pixel tiles as shown on the right side of FIG. 8. In order to obtain the data for the position R=0, S=0, all channels 0-63 for position R=0 S=0 need to be read from shared memory. For the first 8×8 pixel tile read by the GMMA, as shown in the top right tile on the 806 column, for position R-0 S=0 pixels for channels C=0-7 of H=0 W=0-7 is read. Since the data is swizzled in shared memory as shown in FIG. 8, all channels 0-63 for eight positions including R=0, S=0 can be read in eight clock cycles.

Figure 9:
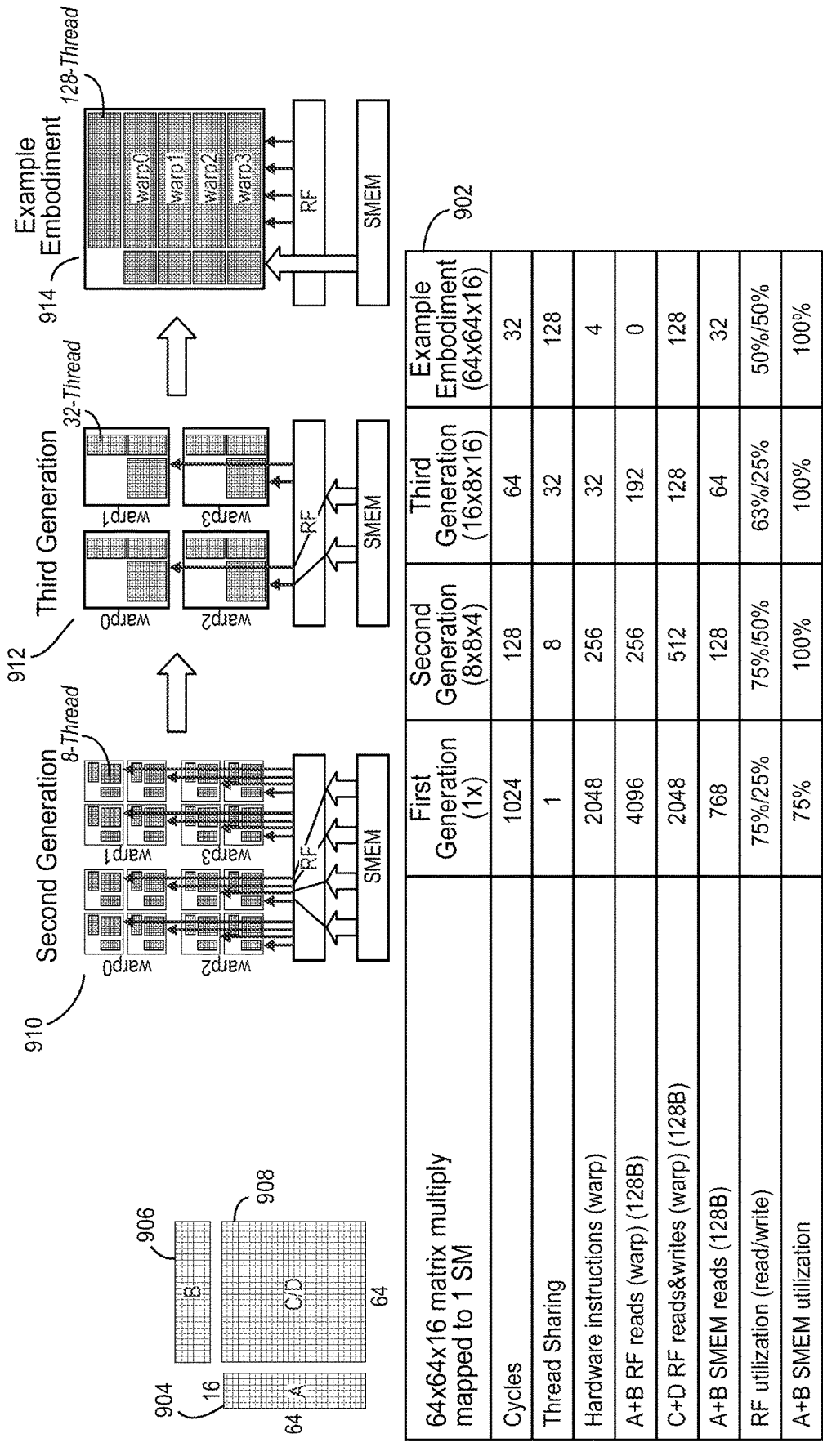
FIG. 9 shows selected performance parameters of an example embodiment in comparison with previous generations of GPUs.

In FIG. 9, The table 902 shows selected performance parameters in comparison among the several illustrated generations of the system for performing a MMA with a 64×16 A matrix 904 and 16×64 B matrix 906 with the 64×64 C/D accumulator/result matrix 908. Four warps are employed in the execution of the MMA.

The system 910 conceptually illustrates the second generation of GPUs for which the performance numbers are provided in the second column of performance numbers. The second generation system 910, which enables each warp to be logically divided into four groups of eight threads each where the threads within a group collaborate to share register files and calculate a portion of the result matrix, requires 16 groups of threads that each reads its own data to perform the calculation. As illustrated, all data from the shared memory is first read to the respective register files before being provided to the datapath.

The system 912, conceptually illustrates the third generation of GPUs for which the performance numbers are provided in the third column of performance numbers. As mentioned before, the third generation enabled all threads in a single warp to share registers in performing MMA, and all data from the shared memory is read via the register files.

The system 914, conceptually illustrates a system according to embodiments of this disclosure. The performance numbers for system 914 is shown in the fourth column of performance numbers in table 902. As illustrated, four warps (e.g., all warps on a streaming multiprocessor according to an embodiment) share register files and shared memory to execute the MMA operation. The tensor cores can read the A and/or B matrix data directly from shared memory, bypassing the register files.

With respect to relative performance of the example embodiments, particular note may be made of the larger number of threads (e.g., 128) that share resources to cooperatively perform the MMA computation, the lower number of hardware instructions required (e.g. 4), the lower register file reads (e.g. 0), and the lower shared memory reads (e.g. 32).

Comparing the third generation with an example embodiment of the present disclosure, register file reads for A and B operands can be completely eliminated while also reducing the number of shared memory reads even if the A and B operands in the example embodiment are read from the shared memory. This is a result of the increase in the size of the matrices that can be shared. It is also worth noting that, the 4 hardware instructions that are required in the example embodiment for the example MMA operation is actually a single instructions that is issued to each of the four warps in this example. As shown in the table 902, some of the example embodiments enabled the doubling of performance while containing the register file utilization and the shared memory utilization.

According to example embodiments, a task comprising an MMA of matrices A, B and C, comprises a plurality of warps executing on a streaming processor and sharing resources such as register files, and in some embodiments, also their respective shared memories. A warp is a group of threads that are launched together, and respective warps in a group of warps are not required to be launched simultaneously.

Although in previous generations of NVIDIA GPUs (as described in relation to FIGS. 5A-5C, for example) multiple threads in a warp could share registers and perform an MMA cooperatively, embodiments of the present disclosure enable multiple warps to cooperate to perform a common MMA. In some embodiments, all threads within all warps share data from and results are written to their register files. In some embodiments, the locations for one or more of getting data from and/or the writing results to also includes the shared memory of the streaming multiprocessor. In one example embodiment, four warps, each of 32 threads each and each running on a respective partition of the same streaming multiprocessor, share the register files and capacity to cooperatively perform a common MMA. In some embodiments, the state machine circuitry controls the execution of the MMA, and in some other embodiments each thread calculates a respective portion of the result matrix.

With multiple warps and a larger number of threads cooperating on a common MMA, at least some of the data (e.g. a larger amount of B matrix data) can be loaded once from memory and shared more widely (e.g. among a larger number of threads) to generate a larger number of elements of the result matrix, thereby substantially improving the memory bandwidth utilization efficiency. The threads can read directly from their register files to the processing core (e.g. tensor core) that performs the MMA operation on that data, and the results from the processing core can be written directly from the processing core to the register files of the respective threads. Thus with more threads, a larger amount of register files are shared.

Example GPU Architecture

An example illustrative architecture in which the efficient MMA disclosed in this application is incorporated will now be described. The following information is set forth for illustrative purposes and should not be construed as limiting in any manner. Any of the following features may be optionally incorporated with or without the exclusion of other features described.

Figure 10:
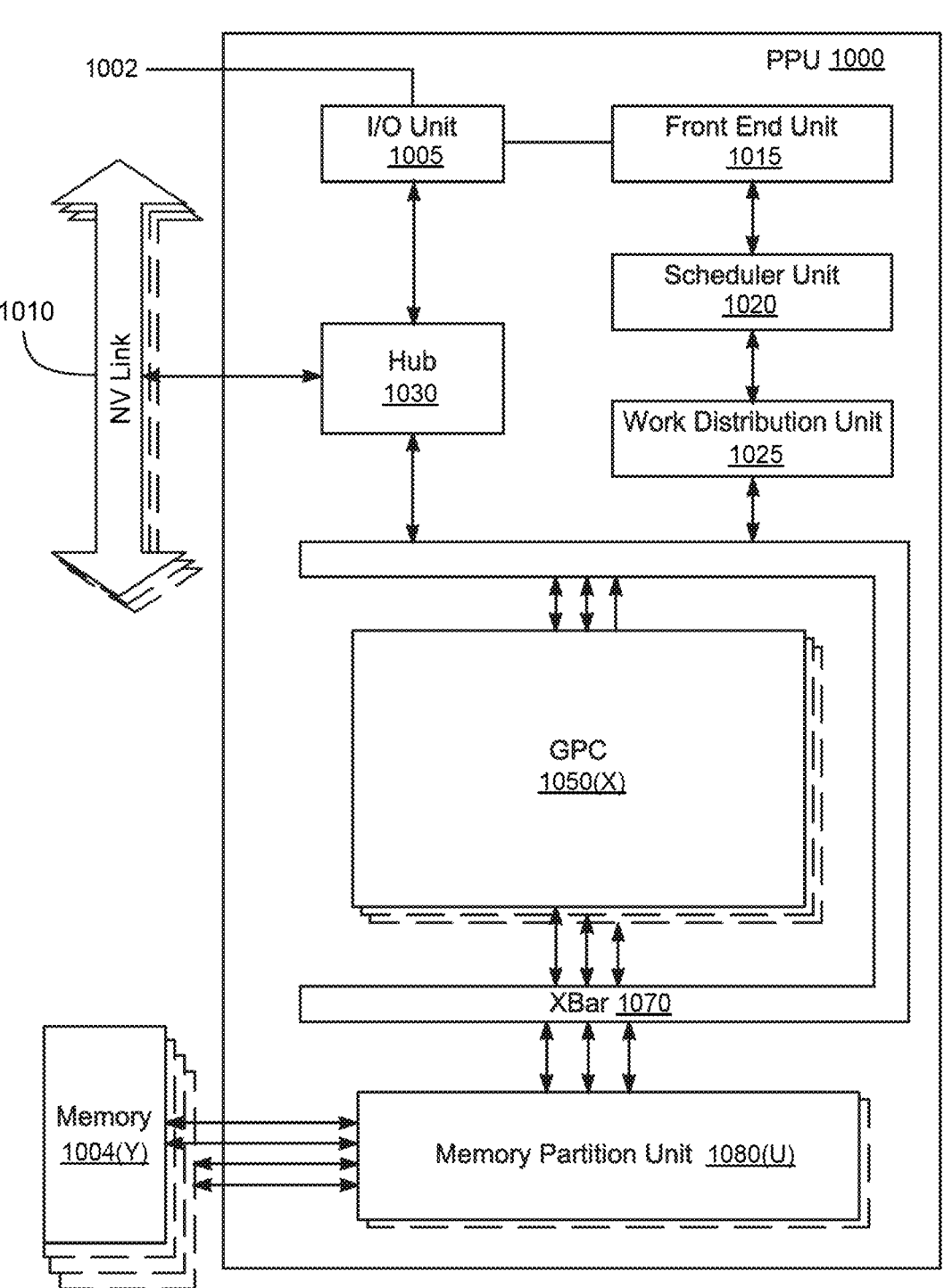
FIG. 10 illustrates an example parallel processing unit of a GPU, according to some embodiments.

FIG. 10 illustrates a parallel processing unit (PPU) 1000, in accordance with an embodiment. In an embodiment, the PPU 1000 is a multi-threaded processor that is implemented on one or more integrated circuit devices. The PPU 1000 is a latency hiding architecture designed to process many threads in parallel. A thread (e.g., a thread of execution) is an instantiation of a set of instructions configured to be executed by the PPU 1000. In an embodiment, the PPU 1000 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1000 may be utilized for performing general-purpose computations. In some other embodiments, PPU 100 configured to implement large neural networks in deep learning applications or other high performance computing applications.

One or more PPUs 1000 may be configured to accelerate thousands of High Performance Computing (HPC), data center, and machine learning applications. The PPU 1000 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the PPU 1000 includes an Input/Output (I/O) unit 1005, a front end unit 1015, a scheduler unit 1020, a work distribution unit 1025, a hub 1030, a crossbar (Xbar) 1070, one or more general processing clusters (GPCs) 1050, and one or more partition units 1080. An LRC 1080, such as, for example, described above in relation to FIGS. 2 and 2A, may be located between crossbar 1070 and the MPU 1080, and may be configured to support the multicast described above. The PPU 1000 may be connected to a host processor or other PPUs 1000 via one or more high-speed NVLink 1010 interconnect. The PPU 1000 may be connected to a host processor or other peripheral devices via an interconnect 1002. The PPU 1000 may also be connected to a memory comprising a number of memory devices 1004. In an embodiment, the memory 1004 may comprise a number of dynamic random access memory (DRAM) devices. The DRAM devices may be configured as a high-bandwidth memory (HBM) subsystem, with multiple DRAM dies stacked within each device.

The NVLink 1010 interconnect enables systems to scale and include one or more PPUs 1000 combined with one or more CPUs, supports cache coherence between the PPUs 1000 and CPUs, and CPU mastering. Data and/or commands may be transmitted by the NVLink 1010 through the hub 1030 to/from other units of the PPU 1000 such as one or more copy engines, a video encoder, a video decoder, a power management unit, etc. (not explicitly shown). The NVLink 1010 is described in more detail in conjunction with FIG. 13A and FIG. 13B.

The I/O unit 1005 is configured to transmit and receive communications (e.g., commands, data, etc.) from a host processor (not shown) over the interconnect 1002. The I/O unit 1005 may communicate with the host processor directly via the interconnect 1002 or through one or more intermediate devices such as a memory bridge. In an embodiment, the I/O unit 1005 may communicate with one or more other processors, such as one or more of the PPUs 1000 via the interconnect 1002. In an embodiment, the I/O unit 1005 implements a Peripheral Component Interconnect Express (PCIe) interface for communications over a PCIe bus and the interconnect 1002 is a PCIe bus. In alternative embodiments, the I/O unit 1005 may implement other types of well-known interfaces for communicating with external devices.

The I/O unit 1005 decodes packets received via the interconnect 1002. In an embodiment, the packets represent commands configured to cause the PPU 1000 to perform various operations. The I/O unit 1005 transmits the decoded commands to various other units of the PPU 1000 as the commands may specify. For example, some commands may be transmitted to the front end unit 1015. Other commands may be transmitted to the hub 1030 or other units of the PPU 1000 such as one or more copy engines, a video encoder, a video decoder, a power management unit, etc. (not explicitly shown). In other words, the I/O unit 1005 is configured to route communications between and among the various logical units of the PPU 1000.

In an embodiment, a program executed by the host processor encodes a command stream in a buffer that provides workloads to the PPU 1000 for processing. A workload may comprise several instructions and data to be processed by those instructions. The buffer is a region in a memory that is accessible (e.g., read/write) by both the host processor and the PPU 1000. For example, the I/O unit 1005 may be configured to access the buffer in a system memory connected to the interconnect 1002 via memory requests transmitted over the interconnect 1002. In an embodiment, the host processor writes the command stream to the buffer and then transmits a pointer to the start of the command stream to the PPU 1000. The front end unit 1015 receives pointers to one or more command streams. The front end unit 1015 manages the one or more streams, reading commands from the streams and forwarding commands to the various units of the PPU 1000.

The front end unit 1015 is coupled to a scheduler unit 1020 that configures the various GPCs 1050 to process tasks defined by the one or more streams. The scheduler unit 1020 is configured to track state information related to the various tasks managed by the scheduler unit 1020. The state may indicate which GPC 1050 a task is assigned to, whether the task is active or inactive, a priority level associated with the task, and so forth. The scheduler unit 1020 manages the execution of a plurality of tasks on the one or more GPCs 1050.

The scheduler unit 1020 is coupled to a work distribution unit 1025 that is configured to dispatch tasks for execution on the GPCs 1050. The work distribution unit 1025 may track a number of scheduled tasks received from the scheduler unit 1020. In an embodiment, the work distribution unit 1025 manages a pending task pool and an active task pool for each of the GPCs 1050. The pending task pool may comprise a number of slots (e.g., 32 slots) that contain tasks assigned to be processed by a particular GPC 1050. The active task pool may comprise a number of slots (e.g., 4 slots) for tasks that are actively being processed by the GPCs 1050. As a GPC 1050 finishes the execution of a task, that task is evicted from the active task pool for the GPC 1050 and one of the other tasks from the pending task pool is selected and scheduled for execution on the GPC 1050. If an active task has been idle on the GPC 1050, such as while waiting for a data dependency to be resolved, then the active task may be evicted from the GPC 1050 and returned to the pending task pool while another task in the pending task pool is selected and scheduled for execution on the GPC 1050.

The work distribution unit 1025 communicates with the one or more GPCs 1050 via XBar 370. The XBar 1070 is an interconnect network that couples many of the units of the PPU 1000 to other units of the PPU 1000. For example, the XBar 1070 may be configured to couple the work distribution unit 1025 to a particular GPC 1050. Although not shown explicitly, one or more other units of the PPU 1000 may also be connected to the XBar 1070 via the hub 1030.

The tasks are managed by the scheduler unit 1020 and dispatched to a GPC 1050 by the work distribution unit 1025. The GPC 1050 is configured to process the task and generate results. The results may be consumed by other tasks within the GPC 1050, routed to a different GPC 1050 via the XBar 1070, or stored in the memory 1004. The results can be written to the memory 1004 via the partition units 1080, which implement a memory interface for reading and writing data to/from the memory 1004. The results can be transmitted to another PPU 1004 or CPU via the NVLink 1010. In an embodiment, the PPU 1000 includes a number U of partition units 1080 that is equal to the number of separate and distinct memory devices 1004 coupled to the PPU 1000. A partition unit 1080 will be described in more detail below in conjunction with FIG. 11B.

In an embodiment, a host processor executes a driver kernel that implements an application programming interface (API) that enables one or more applications executing on the host processor to schedule operations for execution on the PPU 1000. In an embodiment, multiple compute applications are simultaneously executed by the PPU 1000 and the PPU 1000 provides isolation, quality of service (QoS), and independent address spaces for the multiple compute applications. An application may generate instructions (e.g., API calls) that cause the driver kernel to generate one or more tasks for execution by the PPU 1000. The driver kernel outputs tasks to one or more streams being processed by the PPU 1000. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads, cooperating threads and a hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety. The shared memory, according to some embodiments, is described in U.S. application Ser. No. 17/691,690, which is hereby incorporated in reference in its entirety.

Figure 11A:
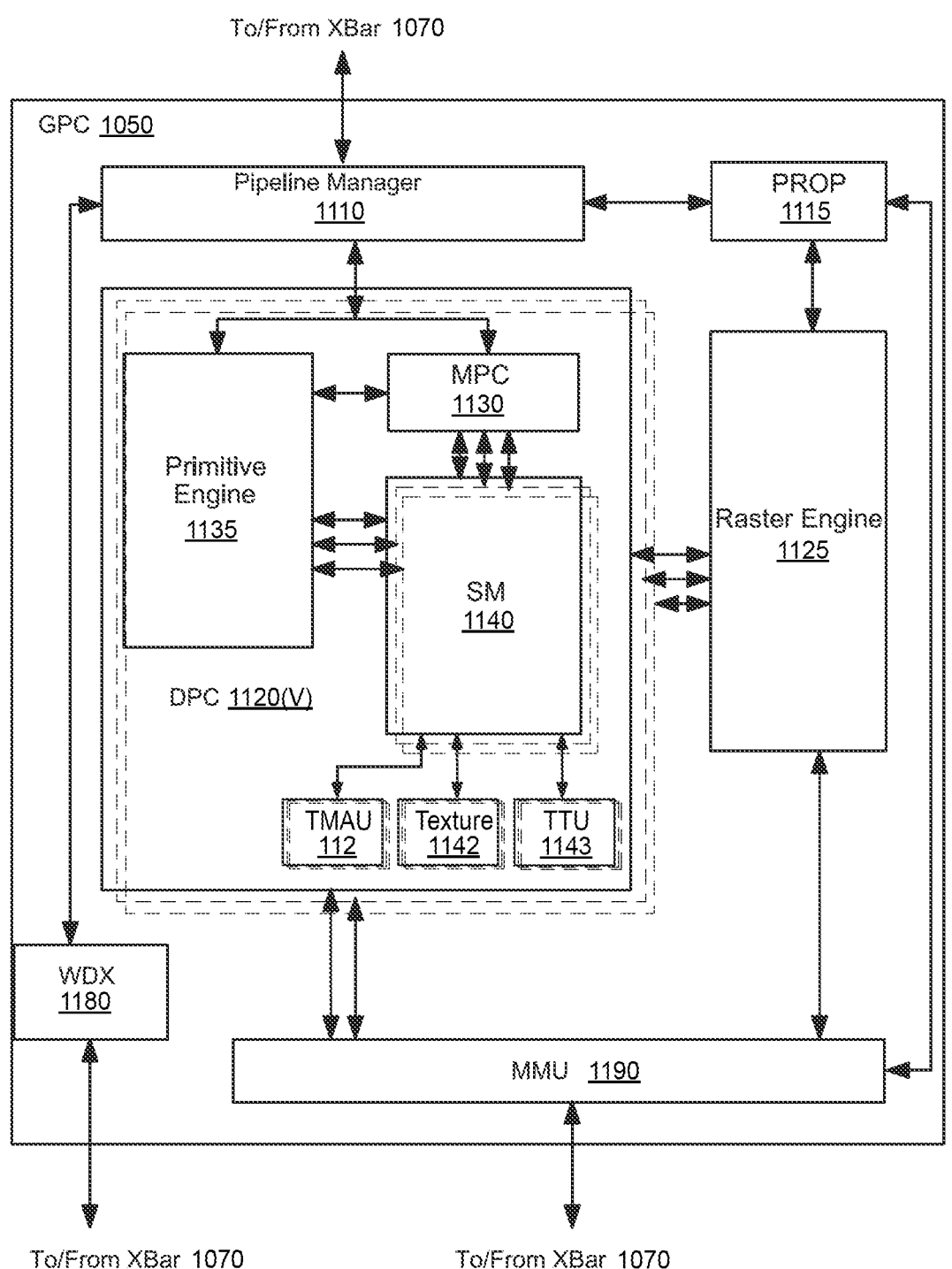
FIG. 11A illustrates an example general processing cluster (GPC) within the parallel processing unit of FIG. 10, according to some embodiments.

FIG. 11A illustrates a GPC 1050 of the PPU 1000 of FIG. 10, in accordance with an embodiment. As shown in FIG. 11A, each GPC 1050 includes a number of hardware units for processing tasks. In an embodiment, each GPC 1050 includes a pipeline manager 1110, a pre-raster operations unit (PROP) 1115, a raster engine 1125, a work distribution crossbar (WDX) 1180, a memory management unit (MMU) 1190, and one or more Data Processing Clusters (DPCs) 1120. It will be appreciated that the GPC 1050 of FIG. 11A may include other hardware units in lieu of or in addition to the units shown in FIG. 11A.

In an embodiment, the operation of the GPC 1050 is controlled by the pipeline manager 1110. The pipeline manager 1110 manages the configuration of the one or more DPCs 1120 for processing tasks allocated to the GPC 1050. In an embodiment, the pipeline manager 1110 may configure at least one of the one or more DPCs 1120 to implement at least a portion of a graphics rendering pipeline, a neural network, and/or a compute pipeline. For example, with respect to a graphics rendering pipeline, a DPC 1120 may be configured to execute a vertex shader program on the programmable streaming multiprocessor (SM) 1140. The pipeline manager 1110 may also be configured to route packets received from the work distribution unit 1025 to the appropriate logical units within the GPC 1050. For example, some packets may be routed to fixed function hardware units in the PROP 1115 and/or raster engine 1125 while other packets may be routed to the DPCs 1120 for processing by the primitive engine 1135 or the SM 1140.

Figure 11B:
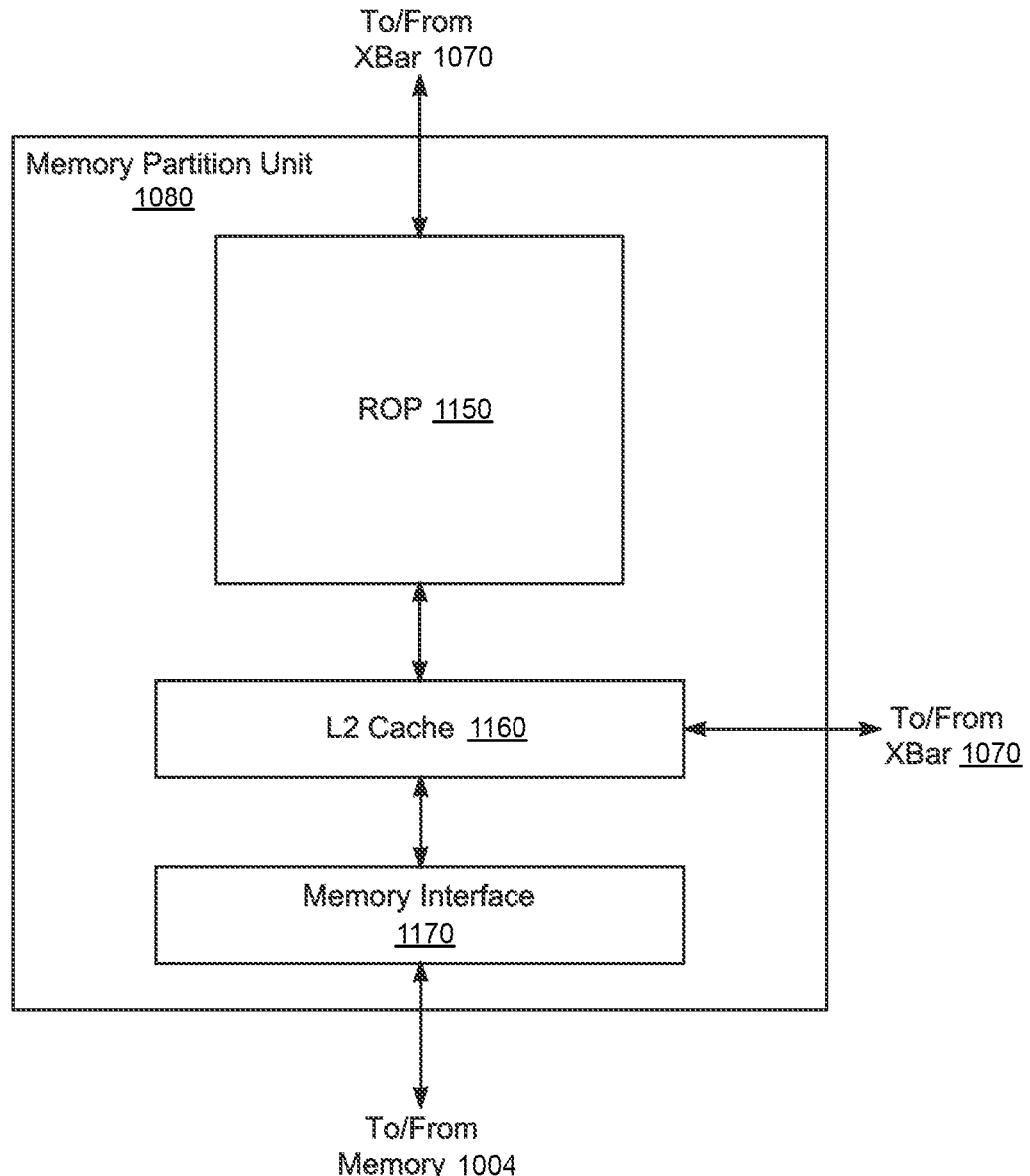
FIG. 11B illustrates an example memory partition unit of the parallel processing unit of FIG. 10.

The PROP unit 1115 is configured to route data generated by the raster engine 1125 and the DPCs 1120 to a Raster Operations (ROP) unit, described in more detail in conjunction with FIG. 11B. The PROP unit 1115 may also be configured to perform optimizations for color blending, organize pixel data, perform address translations, and the like.

Each DPC 1120 included in the GPC 1050 includes an M-Pipe Controller (MPC) 1130, a primitive engine 1135, and one or more SMs 1140. The MPC 1130 controls the operation of the DPC 1120, routing packets received from the pipeline manager 1110 to the appropriate units in the DPC 1120. For example, packets associated with a vertex may be routed to the primitive engine 1135, which is configured to fetch vertex attributes associated with the vertex from the memory 1004. In contrast, packets associated with a shader program may be transmitted to the SM 1140.

The SM 1140 comprises a programmable streaming processor that is configured to process tasks represented by a number of threads. Each SM 1140 is multi-threaded and configured to execute a plurality of threads (e.g., 32 threads) from a particular group of threads concurrently. In an embodiment, the SM 1140 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 1140 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1140 is described in more detail below in conjunction with FIG. 12A.

The MMU 1190 provides an interface between the GPC 1050 and the partition unit 1080. The MMU 1190 may provide translation of virtual addresses into physical addresses, memory protection, and arbitration of memory requests. In an embodiment, the MMU 1190 provides one or more translation lookaside buffers (TLBs) for performing translation of virtual addresses into physical addresses in the memory 1004.

FIG. 11B illustrates a memory partition unit 1080 of the PPU 1000 of FIG. 10 in accordance with an embodiment. As shown in FIG. 11B, the memory partition unit 1080 includes a Raster Operations (ROP) unit 1150, a level two (L2) cache 1160, and a memory interface 1170. The memory interface 1170 is coupled to the memory 1004. Memory interface 1170 may implement 32, 64, 128, 1024-bit data buses, or the like, for high-speed data transfer. In an embodiment, the PPU 1000 incorporates U memory interfaces 1170, one memory interface 1170 per pair of partition units 1080, where each pair of partition units 1080 is connected to a corresponding memory device 1004. For example, PPU 1000 may be connected to up to Y memory devices 1004, such as high bandwidth memory stacks or graphics double-data-rate, version 5, synchronous dynamic random access memory, or other types of persistent storage.

In an embodiment, the memory interface 1170 implements an HBM2 memory interface and Y equals half U. In an embodiment, the HBM2 memory stacks are located on the same physical package as the PPU 1000, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1004 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1000 process very large datasets and/or run applications for extended periods.

In an embodiment, the PPU 1000 implements a multi-level memory hierarchy. In an embodiment, the memory partition unit 1080 supports a unified memory to provide a single unified virtual address space for CPU and PPU 300 memory, enabling data sharing between virtual memory systems. In an embodiment the frequency of accesses by a PPU 1000 to memory located on other processors is traced to ensure that memory pages are moved to the physical memory of the PPU 1000 that is accessing the pages more frequently. In an embodiment, the NVLink 1010 supports address translation services allowing the PPU 1000 to directly access a CPU's page tables and providing full access to CPU memory by the PPU 1000.

In an embodiment, copy engines transfer data between multiple PPUs 1000 or between PPUs 1000 and CPUs. The copy engines can generate page faults for addresses that are not mapped into the page tables. The memory partition unit 1080 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1004 or other system memory may be fetched by the memory partition unit 1080 and stored in the L2 cache 1160, which is located on-chip and is shared between the various GPCs 1050. As shown, each memory partition unit 1080 includes a portion of the L2 cache 1160 associated with a corresponding memory device 1004. Lower level caches may then be implemented in various units within the GPCs 1050. For example, each of the SMs 1140 may implement a level one (L1) cache. The L1 cache is private memory that is dedicated to a particular SM 1140. Data from the L2 cache 1160 may be fetched and stored in each of the L1 caches for processing in the functional units of the SMs 1140. The L2 cache 1160 is coupled to the memory interface 1170 and the XBar 1070.

The ROP unit 1150 performs graphics raster operations related to pixel color, such as color compression, pixel blending, and the like. The ROP unit 450 also implements depth testing in conjunction with the raster engine 1125, receiving a depth for a sample location associated with a pixel fragment from the culling engine of the raster engine 1125. The depth is tested against a corresponding depth in a depth buffer for a sample location associated with the fragment. If the fragment passes the depth test for the sample location, then the ROP unit 1150 updates the depth buffer and transmits a result of the depth test to the raster engine 1125. It will be appreciated that the number of partition units 1080 may be different than the number of GPCs 1050 and, therefore, each ROP unit 1150 may be coupled to each of the GPCs 1050. The ROP unit 1150 tracks packets received from the different GPCs 1050 and determines which GPC 1050 that a result generated by the ROP unit 1150 is routed to through the Xbar 1070. Although the ROP unit 1150 is included within the memory partition unit 1080 in FIG. 11B, in other embodiment, the ROP unit 1150 may be outside of the memory partition unit 1080. For example, the ROP unit 1150 may reside in the GPC 1050 or another unit.

Figure 12A:
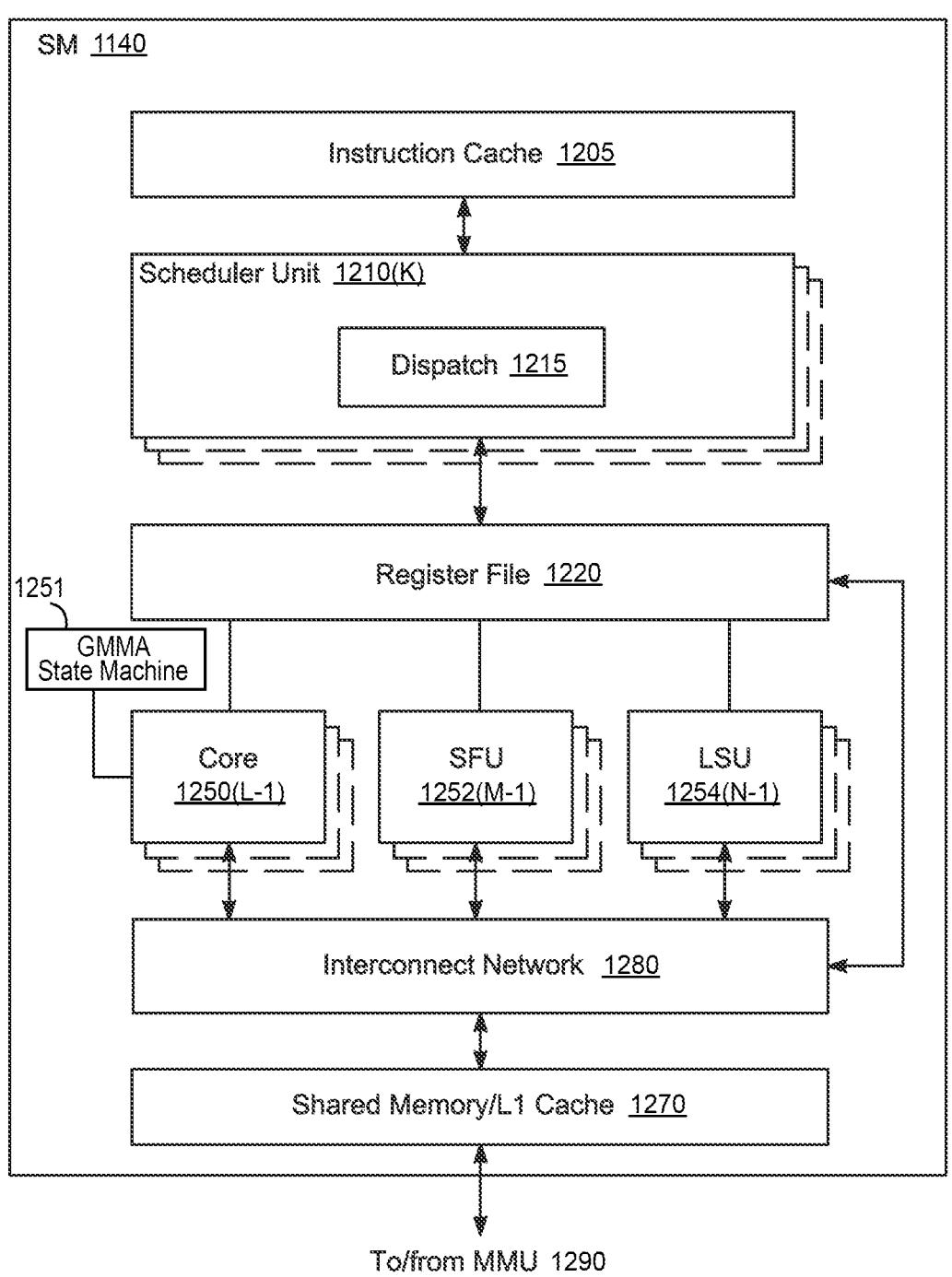
FIG. 12A illustrates an example streaming multiprocessor (SM) of FIG. 11A with MMA state machine circuitry, according to some embodiments.
Figure 12B:
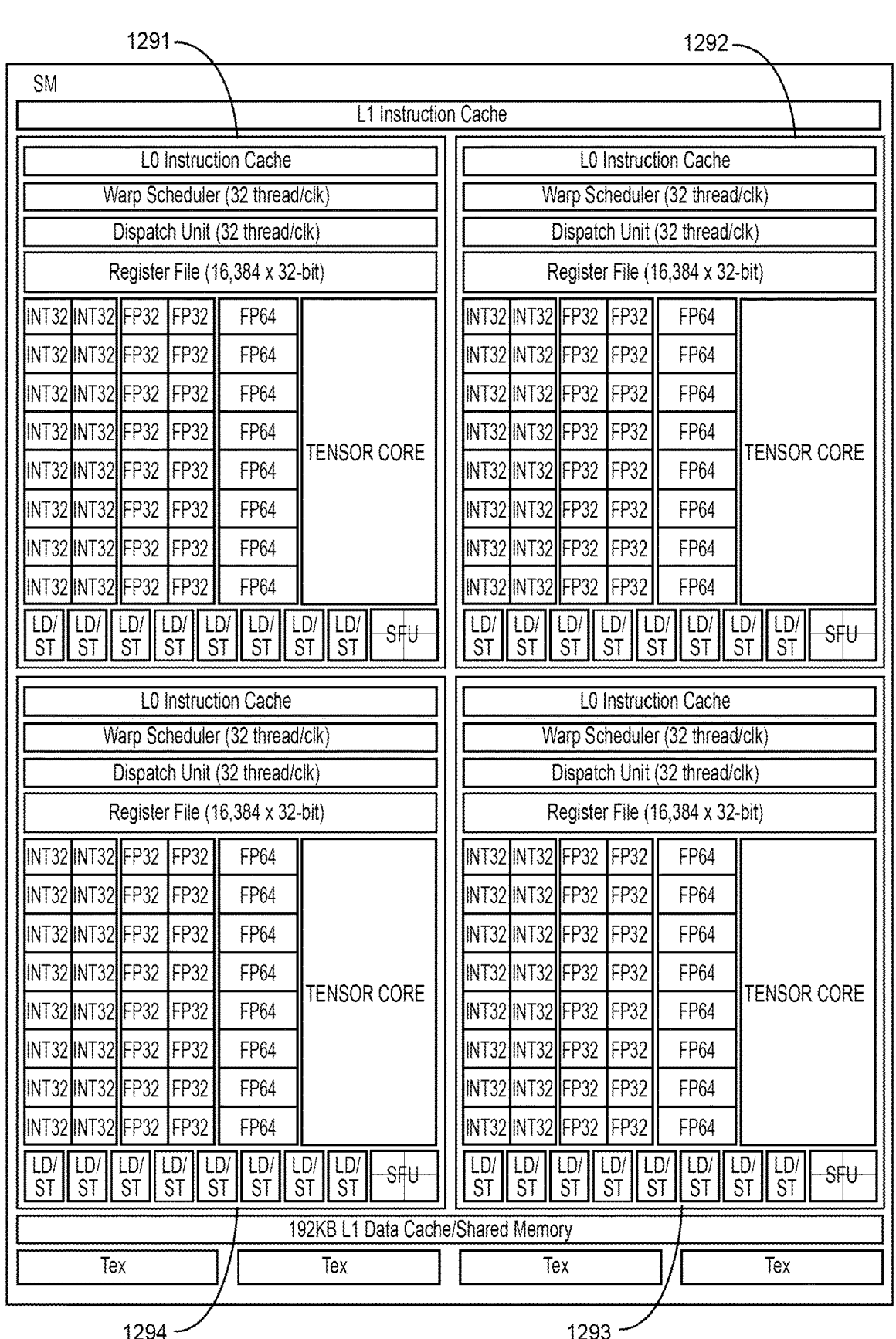
FIG. 12B conceptually illustrates four subpartitions implemented in an SM such as the SM shown in FIG. 12A, according to some embodiments.

FIG. 12A illustrates the streaming multiprocessor 1140 of FIG. 11A, in accordance with an embodiment. As shown in FIG. 12A, the SM 1140 includes an instruction cache 1205, one or more scheduler units 1210, a register file 1220, one or more processing cores 1250, one or more special function units (SFUs) 1252, one or more load/store units (LSUs) 1254, an interconnect network 1280, a shared memory/L1 cache 1270.

As described above, the work distribution unit 1025 dispatches tasks for execution on the GPCs 1050 of the PPU 1000. The tasks are allocated to a particular DPC 1120 within a GPC 1050 and, if the task is associated with a shader program, the task may be allocated to an SM 1140. The scheduler unit 1210 receives the tasks from the work distribution unit 1025 and manages instruction scheduling for one or more thread blocks assigned to the SM 1140. The scheduler unit 1210 schedules thread blocks for execution as warps of parallel threads, where each thread block consists of at least one warp. In an embodiment, each warp comprises 32 threads. The scheduler unit 1210 may manage a plurality of different thread blocks, allocating the different thread blocks to different warps and then dispatching instructions from the plurality of different cooperative groups to the various functional units (e.g., cores 1250, SFUs 1252, and LSUs 1254) during each clock cycle.

Cooperative Group Arrays (CGAs) provide a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Group Arrays enable programmers to define groups of threads explicitly at sub-block (e.g., as small as a single thread) and multi-block granularities, and to perform collective operations on the threads such as synchronization in a cooperative group. The programming model supports clean composition across software boundaries, so that libraries and utility functions can synchronize safely within their local context without having to make assumptions about convergence. Cooperative Group Array primitives enable new patterns of cooperative parallelism, including producer-consumer parallelism, opportunistic parallelism, and global synchronization across an entire grid of thread blocks. Hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety.

A dispatch unit 1215 is configured to transmit instructions to one or more of the functional units. In the embodiment, the scheduler unit 1210 includes two dispatch units 1215 that enable two different instructions from the same warp to be dispatched during each clock cycle. In alternative embodiments, each scheduler unit 1210 may include a single dispatch unit 1215 or additional dispatch units 1215.

Each SM 1140 includes a register file 1220 that provides a set of registers for the functional units of the SM 1140. In an embodiment, the register file 1220 is divided between each of the functional units such that each functional unit is allocated a dedicated portion of the register file 1220. In another embodiment, the register file 1220 is divided between the different warps being executed by the SM 1140.

The register file 1220 provides temporary storage for operands connected to the data paths of the functional units.

Each SM 1140 comprises multiple processing cores 1250. In an embodiment, the SM 1140 includes a large number (e.g., 128, etc.) of distinct processing cores 1250. Each core 1250 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic.

Tensor cores are configured to perform matrix operations, and, in an embodiment, one or more tensor cores are included in the cores 1250. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor cores are used to perform much larger two-dimensional or higher dimensional matrix operations, built up from these smaller elements. An API, such as CUDA C++ API, exposes specialized matrix load, matrix multiply and accumulate, and matrix store operations to efficiently use Tensor cores from a CUDA-C++ program. At the CUDA level, the warp-level interface assumes 16×16 size matrices spanning all 32 threads of the warp.

In some embodiments, transposition hardware is included in the processing cores 1250 or another functional unit (e.g., SFUs 1252 or LSUs 1254) and is configured to generate matrix data stored by diagonals and/or generate the original matrix and/or transposed matrix from the matrix data stored by diagonals. The transposition hardware may be provide inside of the shared memory 1270 to register file 1220 load path of the SM 1140.

In some embodiments, GMMA state machine hardware circuitry 1251 operates to load operands to the inputs of processing cores that perform MMA operations. Circuitry 1251 may operate in a manner similar to that described in relation to state machine 702 to control collaborative MMA operation by a group of warps in which respective warps execute on respectively different partitions of the SM. FIG. 12B illustrates the logical division of SM circuitry to four subpartitions 1291, 1292, 1293 and 1294.

In one example, the matrix data stored by diagonals may be fetched from DRAM and stored in the shared memory 1270. As the instruction to perform processing using the matrix data stored by diagonals is processed, transposition hardware disposed in the path of the shared memory 1270 and the register file 1220 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 1220.

Each SM 1140 also comprises multiple SFUs 1252 that perform special functions (e.g., attribute evaluation, reciprocal square root, and the like). In an embodiment, the SFUs 1252 may include a tree traversal unit (e.g., TTU 1143) configured to traverse a hierarchical tree data structure. In an embodiment, the SFUs 1252 may include texture unit (e.g., Texture Unit 1142) configured to perform texture map filtering operations. In an embodiment, the texture units are configured to load texture maps (e.g., a 2D array of texels) from the memory 1004 and sample the texture maps to produce sampled texture values for use in shader programs executed by the SM 1140. In an embodiment, the texture maps are stored in the shared memory/L1 cache 1170. The texture units implement texture operations such as filtering operations using mip-maps (e.g., texture maps of varying levels of detail). In an embodiment, each SM 1140 includes two texture units.

Each SM 1140 also comprises multiple LSUs 1254 that implement load and store operations between the shared memory/L1 cache 1270 and the register file 1220. Each SM 1140 includes an interconnect network 1280 that connects each of the functional units to the register file 1220 and the LSU 1254 to the register file 1220, shared memory/L1 cache 1270. In an embodiment, the interconnect network 1280 is a crossbar that can be configured to connect any of the functional units to any of the registers in the register file 1220 and connect the LSUs 1254 to the register file 1220 and memory locations in shared memory/L1 cache 1270.

The shared memory/L1 cache 1270 is an array of on-chip memory that allows for data storage and communication between the SM 1140 and the primitive engine 1135 and between threads in the SM 1140. In an embodiment, the shared memory/L1 cache 1270 comprises 128 KB of storage capacity and is in the path from the SM 1140 to the partition unit 1080. The shared memory/L1 cache 1270 can be used to cache reads and writes. One or more of the shared memory/L1 cache 1270, L2 cache 1160, and memory 1004 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1270 enables the shared memory/L1 cache 1270 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local shared memory enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 11A, are bypassed, creating a much simpler programming model. In the general purpose parallel computation configuration, the work distribution unit 1025 assigns and distributes blocks of threads directly to the DPCs 1120. The threads in a block execute the same program, using a unique thread ID in the calculation to ensure each thread generates unique results, using the SM 1140 to execute the program and perform calculations, shared memory/L1 cache 1270 to communicate between threads, and the LSU 1254 to read and write global memory through the shared memory/L1 cache 1270 and the memory partition unit 1080. When configured for general purpose parallel computation, the SM 1140 can also write commands that the scheduler unit 1020 can use to launch new work on the DPCs 1120.

The PPU 1000 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1000 is embodied on a single semiconductor substrate. In another embodiment, the PPU 1000 is included in a system-on-a-chip (SoC) along with one or more other devices such as additional PPUs 1000, the memory 1004, a reduced instruction set computer (RISC) CPU, a memory management unit (MMU), a digital-to-analog converter (DAC), and the like.

In an embodiment, the PPU 1000 may be included on a graphics card that includes one or more memory devices 1004. The graphics card may be configured to interface with a PCIe slot on a motherboard of a desktop computer. In yet another embodiment, the PPU 1000 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13A:
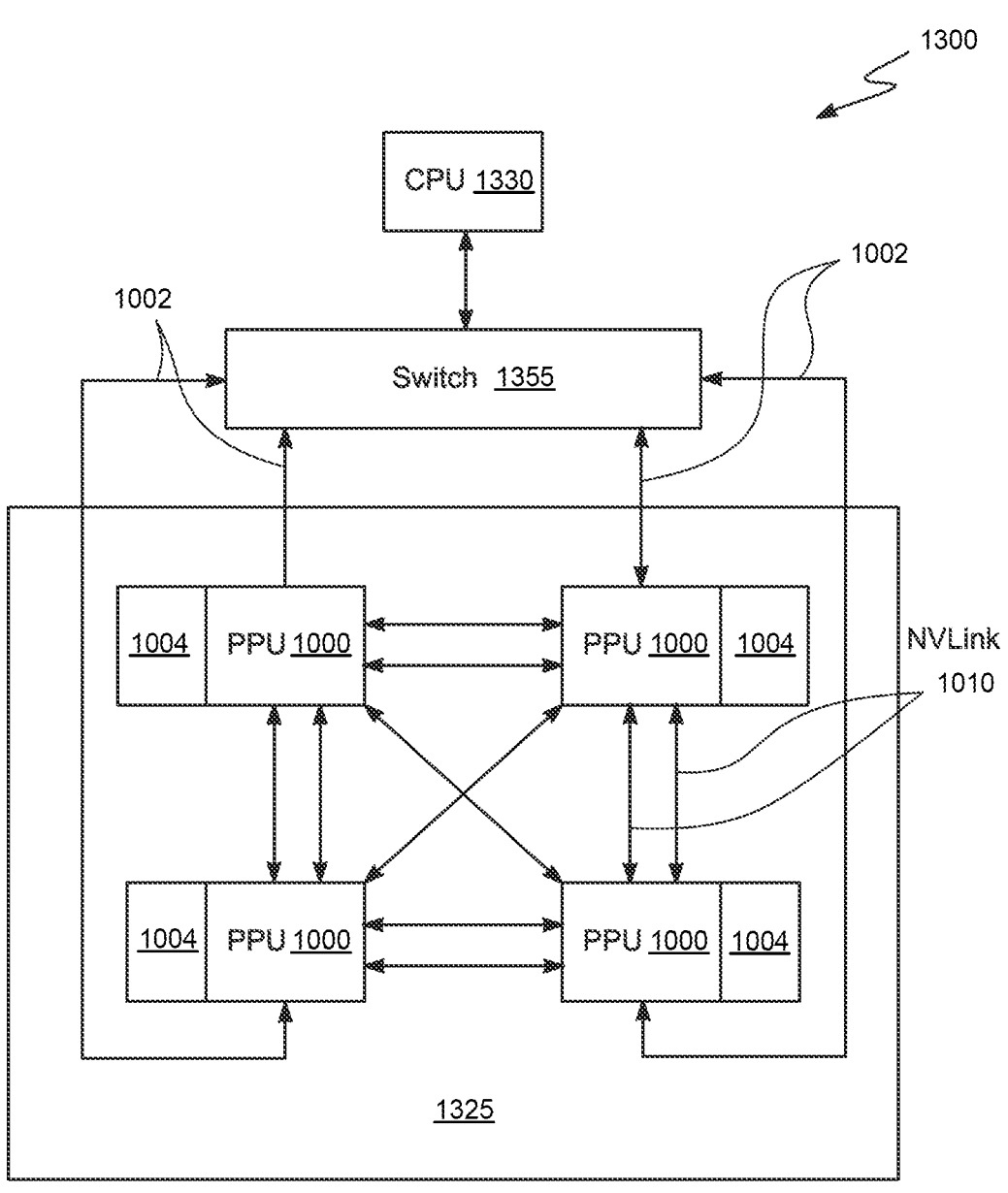
FIG. 13A is an example conceptual diagram of a processing system implemented using the parallel processing unit (PPU) of FIG. 10.

FIG. 13A is a conceptual diagram of a processing system 1300 implemented using the PPU 1000 of FIG. 10, in accordance with an embodiment. The exemplary system 1300 may be configured to implement the methods disclosed in this application (e.g., the TMAU in FIG. 1, 2, 6 or 11A). The processing system 1300 includes a CPU 1330, switch 1355, and multiple PPUs 1000 each and respective memories 1004. The NVLink 1010 provides high-speed communication links between each of the PPUs 1000. Although a particular number of NVLink 1010 and interconnect 1002 connections are illustrated in FIG. 13A, the number of connections to each PPU 1000 and the CPU 1330 may vary. The switch 1355 interfaces between the interconnect 1002 and the CPU 1330. The PPUs 1000, memories 1004, and NVLinks 1010 may be situated on a single semiconductor platform to form a parallel processing module 1325. In an embodiment, the switch 1355 supports two or more protocols to interface between various different connections and/ or links.

In another embodiment (not shown), the NVLink 1010 provides one or more high-speed communication links between each of the PPUs 1000 and the CPU 1330 and the switch 1355 interfaces between the interconnect 1002 and each of the PPUs 1000. The PPUs 1000, memories 1004, and interconnect 1002 may be situated on a single semiconductor platform to form a parallel processing module 1325. In yet another embodiment (not shown), the interconnect 1002 provides one or more communication links between each of the PPUs 1000 and the CPU 1330 and the switch 1355 interfaces between each of the PPUs 1000 using the NVLink 1010 to provide one or more high-speed communication links between the PPUs 1000. In another embodiment (not shown), the NVLink 1010 provides one or more high-speed communication links between the PPUs 1000 and the CPU 1330 through the switch 1355. In yet another embodiment (not shown), the interconnect 1002 provides one or more communication links between each of the PPUs 1000 directly. One or more of the NVLink 1010 high-speed communication links may be implemented as a physical NVLink interconnect or either an on-chip or on-die interconnect using the same protocol as the NVLink 1010.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1325 may be implemented as a circuit board substrate and each of the PPUs 1000 and/or memories 1004 may be packaged devices. In an embodiment, the CPU 1330, switch 1355, and the parallel processing module 1325 are situated on a single semiconductor platform.

In an embodiment, the signaling rate of each NVLink 1010 is 20 to 25 Gigabits/second and each PPU 1000 includes six NVLink 1010 interfaces (as shown in FIG. 13A, five NVLink 1010 interfaces are included for each PPU 1000). Each NVLink 1010 provides a data transfer rate of 25 Gigabytes/second in each direction, with six links providing 1000 Gigabytes/second. The NVLinks 1010 can be used exclusively for PPU-to-PPU communication as shown in FIG. 13A, or some combination of PPU-to-PPU and PPU-to-CPU, when the CPU 1330 also includes one or more NVLink 1010 interfaces.

In an embodiment, the NVLink 1010 allows direct load/store/atomic access from the CPU 1330 to each PPU's 1000 memory 1004. In an embodiment, the NVLink 1010 supports coherency operations, allowing data read from the memories 1004 to be stored in the cache hierarchy of the CPU 1330, reducing cache access latency for the CPU 1330. In an embodiment, the NVLink 1010 includes support for Address Translation Services (ATS), allowing the PPU 1000 to directly access page tables within the CPU 1330. One or more of the NVLinks 1010 may also be configured to operate in a low-power mode.

Figure 13B:
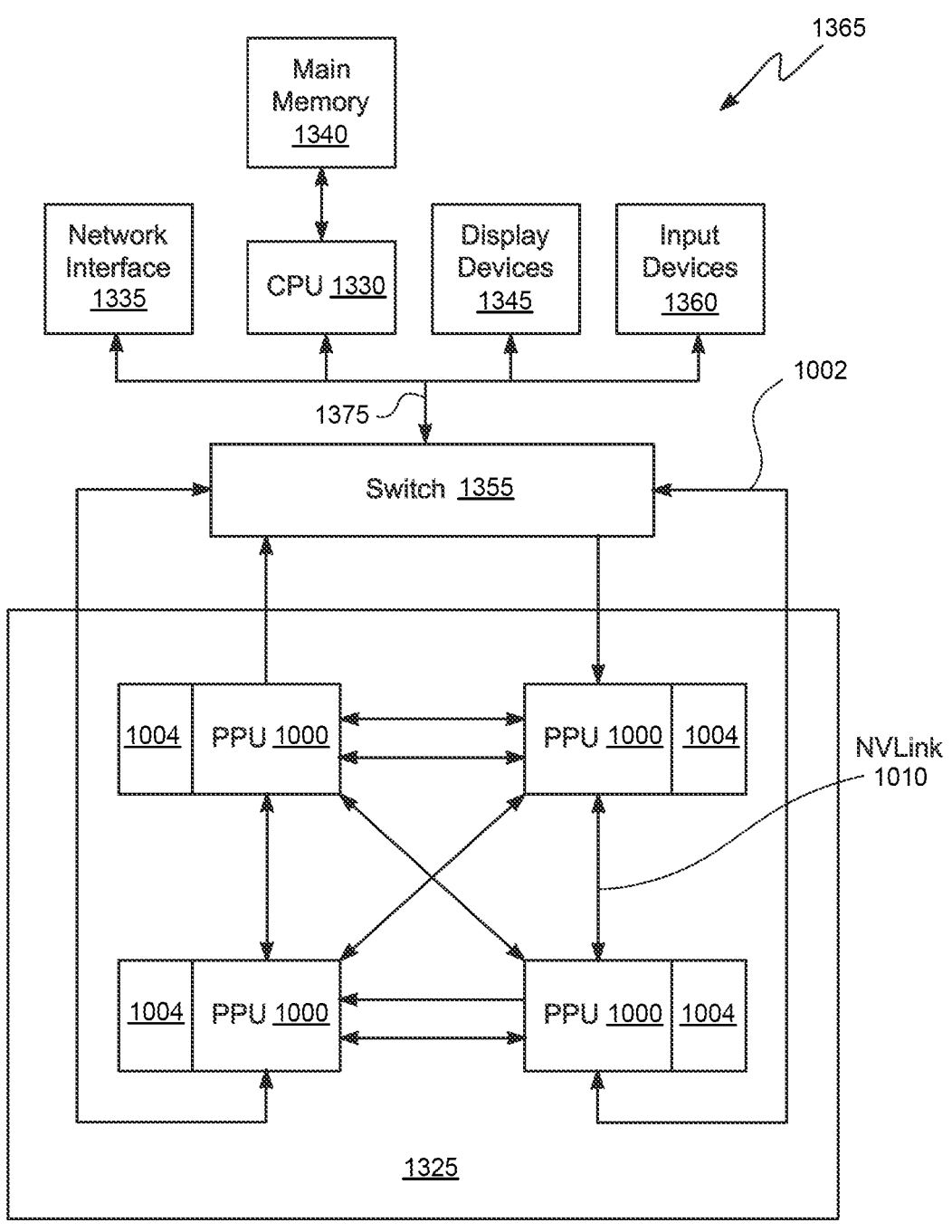
FIG. 13B is a block diagram of an exemplary system in which the various architecture and/or functionality of the various previous embodiments may be implemented.

FIG. 13B illustrates an exemplary system 1365 in which the various architecture and/or functionality of the various previous embodiments may be implemented. The exemplary system 1365 may be configured to implement the methods disclosed in this application (e.g., the TMAU in FIG. 1, 2, 6 or 11A).

As shown, a system 1365 is provided including at least one central processing unit 1330 that is connected to a communication bus 1375. The communication bus 1375 may be implemented using any suitable protocol, such as PCI (Peripheral Component Interconnect), PCI-Express, AGP (Accelerated Graphics Port), HyperTransport, or any other bus or point-to-point communication protocol(s). The system 1365 also includes a main memory 1340. Control logic (software) and data are stored in the main memory 1340 which may take the form of random access memory (RAM).

The system 1365 also includes input devices 1360, the parallel processing system 1325, and display devices 1345, e.g. a conventional CRT (cathode ray tube), LCD (liquid crystal display), LED (light emitting diode), plasma display or the like. User input may be received from the input devices 1360, e.g., keyboard, mouse, touchpad, microphone, and the like. Each of the foregoing modules and/or devices may even be situated on a single semiconductor platform to form the system 1365. Alternately, the various modules may also be situated separately or in various combinations of semiconductor platforms per the desires of the user.

Further, the system 1365 may be coupled to a network (e.g., a telecommunications network, local area network (LAN), wireless network, wide area network (WAN) such as the Internet, peer-to-peer network, cable network, or the like) through a network interface 1335 for communication purposes.

The system 1365 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1340 and/or the secondary storage. Such computer programs, when executed, enable the system 1365 to perform various functions. The memory 1340, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1365 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the PPU 1000. The API provides an abstraction for a programmer that lets a programmer utilize specialized graphics hardware, such as the PPU 1000, to generate the graphical data without requiring the programmer to utilize the specific instruction set for the PPU 1000. The application may include an API call that is routed to the device driver for the PPU 1000. The device driver interprets the API call and performs various operations to respond to the API call. In some instances, the device driver may perform operations by executing instructions on the CPU. In other instances, the device driver may perform operations, at least in part, by launching operations on the PPU 1000 utilizing an input/output interface between the CPU and the PPU 1000. In an embodiment, the device driver is configured to implement the graphics processing pipeline 1400 utilizing the hardware of the PPU 1000.

Various programs may be executed within the PPU 1000 in order to implement the various stages of the processing for the application program. For example, the device driver may launch a kernel on the PPU 1000 to perform one stage of processing on one SM 1140 (or multiple SMs 1140). The device driver (or the initial kernel executed by the PPU 1000) may also launch other kernels on the PPU 1000 to perform other stages of the processing. If the application program processing includes a graphics processing pipeline, then some of the stages of the graphics processing pipeline may be implemented on fixed unit hardware such as a rasterizer or a data assembler implemented within the PPU 1000. It will be appreciated that results from one kernel may be processed by one or more intervening fixed function hardware units before being processed by a subsequent kernel on an SM 1140.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A processor comprising:
a plurality of cores, each core comprising a datapath;
a work distributor circuit configured to distribute a plurality of warps to the plurality of cores, the plurality of warps including a plurality of threads cooperating to execute a matrix multiply and accumulate (MMA) instruction to determine a result matrix based on input matrices;
a state machine circuitry configured to coordinate execution of the MMA instruction to generate the result matrix;
a register file;
a shared memory; and
an interconnection switch,
wherein each core executes the MMA instruction to generate one or more elements of the result matrix at an output of the datapath of said each core, and wherein the state machine circuitry is further configured to copy operands of said input matrices from at least one of a portion of the shared memory or a portion of the register file of any thread of any said plurality of warps to an input of the datapath of any of said plurality of cores.

2. The processor according to claim 1, further comprising a register file and an interconnection switch configured to copy operands of said input matrices from a portion of the register file of any thread of any said plurality of warps to an input of the datapath of any of said plurality of cores.

3. The processor according to claim 1, wherein the processor further comprises a shared memory and an interface to an external memory, and the interconnection switch is further configured to copy operands of said input matrices from a portion of the shared memory to an input of the datapath of any of said plurality of cores.

4. The processor according to claim 1, wherein the state machine circuitry is further configured to initiate said copying of operands of the input matrices responsive to all of said plurality of warps satisfying a synchronization barrier.

5. The processor according to claim 4, wherein the state machine circuitry is further configured to signal to all of said plurality of warps an end of the MMA instruction.

6. The processor according to claim 5, wherein the state machine circuitry is further configured to update a second synchronization barrier to signal the end of the MMA instruction to all of said plurality of warps.

7. The processor according to claim 5, wherein the state machine circuitry is further configured to, between said initiating of the copying of operands of the input matrices and the signaling of the end of the MMA instruction to the plurality of warps, update one or more additional synchronization barriers to signal completion of calculating respective parts of the result matrix to the plurality of the warps.

8. The processor according to claim 4, wherein an instruction stream executed by the plurality of warps includes the MMA instruction and a MMA synchronization instruction that is arranged after the MMA instruction in the instruction stream, the MMA synchronization instruction indicating a completion of one or more previous MMA instructions to the plurality of warps.

9. The processor according to claim 1, comprising a plurality of streaming multiprocessors, wherein a streaming multiprocessor of the plurality of streaming multiprocessors comprises the plurality of cores and the work distributor circuit.

10. The processor according to claim 1, wherein the datapath includes a tensor core.

11. A processor comprising:
a plurality of cores, each core comprising a datapath;
a work distributor circuit configured to distribute a plurality of warps to the plurality of cores, the plurality of warps including a plurality of threads cooperating to execute a matrix multiply and accumulate (MMA) instruction to determine a result matrix based on input matrices, wherein each core executes the MMA instruction to generate one or more elements of the result matrix at an output of the datapath of said each core, and wherein, for calculating elements of a particular row of the result matrix, a same portion of an input matrix is provided to one or more cores in the plurality of cores by providing data of the same portion obtained from shared memory with each read operation to said one or more cores.

12. The processor according to claim 11, wherein the calculating uses a read first input matrix and read portions of a second input matrix from the respective shared memories, and a third input matrix in respective register files.

13. The processor according to claim 12, wherein respective portions of the result matrix is written to the respective register files of each thread.

14. The processor according to claim 2, wherein the read first input matrix and the read portions of the second input matrix are subsequently loaded to inputs of the datapaths of the plurality of cores without being stored in register files of the plurality of warps.

15. The processor according to claim 12, wherein an instruction to read the first input matrix or the second input matrix includes a descriptor identifying a location and/or layout of data in the memory and wherein the processor further comprises a state machine circuitry configured to obtain the first input matrix or the second input matrix in accordance with a descriptor.

16. The processor according to claim 12, wherein the processor further includes transpose circuitry configured to transpose the data read from the memory before the data is written to the shared memory and/or the register files.

17. The processor according to claim 12, wherein a sequence of instructions further causes, at least one of the first input matrix to be read or respectively different portions of a second input matrix to be read to be multicast to the respective cores.

18. A method comprising receive an instruction stream including a matrix multiply and accumulate (MMA) instruction to determine a result matrix based on input matrices;

distribute a plurality of warps to a plurality of cores, each core comprising a datapath, each warp including a plurality of threads executing instructions from the instruction stream;

execute, by each core of the plurality of cores, the MMA instruction to generate one or more elements of the result matrix at an output of the datapath of said each core;

coordinating, by a state machine circuitry, the execution of the MMA instruction to generate the result matrix; and copying, by the state machine circuitry, operands of said input matrices from at least one of a portion of a shared memory of any thread of any said plurality of warps or a portion of a register file of any thread of any said plurality of warps to an input of the datapath of any of said plurality of cores.

* * * * *